United States Patent
Baek et al.

(10) Patent No.: US 11,258,359 B2
(45) Date of Patent: Feb. 22, 2022

(54) SWITCHING REGULATOR GENERATING CONTINUOUS OUTPUT DELIVERY CURRENT AND OPERATING METHOD THEREOF

(71) Applicant: Samsung Electronics Co., Ltd., Suwon-si (KR)

(72) Inventors: Jong-beom Baek, Yangju-si (KR); Dong-su Kim, Suwon-si (KR); Jun-suk Bang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 19 days.

(21) Appl. No.: 16/832,245

(22) Filed: Mar. 27, 2020

(65) Prior Publication Data
US 2020/0228003 A1    Jul. 16, 2020

Related U.S. Application Data

(63) Continuation of application No. 16/436,224, filed on Jun. 10, 2019, now abandoned.

(30) Foreign Application Priority Data

Nov. 5, 2018  (KR) .................. 10-2018-0134439

(51) Int. Cl.
*H02M 3/07*  (2006.01)
*H02M 3/158*  (2006.01)

(52) U.S. Cl.
CPC ............ *H02M 3/07* (2013.01); *H02M 3/1582* (2013.01); *H02M 3/1588* (2013.01)

(58) Field of Classification Search
CPC .... H02M 3/07; H02M 3/1582; H02M 3/1588; H02M 1/0095; H02M 3/156; H02M 3/158

See application file for complete search history.

(56) References Cited

U.S. PATENT DOCUMENTS 9,086,715 B2   7/2015  Riehl
9,136,756 B2   9/2015  Liu
(Continued)

FOREIGN PATENT DOCUMENTS

DE   10 2015 224 476 A1   6/2017
JP       2013-192383 A    9/2013

OTHER PUBLICATIONS

German Office Action dated Sep. 17, 2020 issued in corresponding German Application No. DE 102019113519.2. English translation has been provided.

*Primary Examiner* — Kyle J Moody
(74) *Attorney, Agent, or Firm* — Harness, Dickey & Pierce, P.L.C.

(57) ABSTRACT

A switching regulator configured to generate an output voltage from an input voltage, includes an inductor, an output capacitor configured to generate the output voltage based on a current passing through the inductor, a flying capacitor, and a plurality of switches. The plurality of switches are configured to operate in at least one of a buck-boost mode or a boost mode to, charge the flying capacitor to the input voltage in a first phase, and provide a boosted voltage from the flying capacitor to the inductor in a second phase, the boosted voltage being generated by charge pumping from the input voltage.

19 Claims, 26 Drawing Sheets

(56) References Cited

U.S. PATENT DOCUMENTS

| | | |
|---|---|---|
| 9,595,871 B1 | 3/2017 | Bayer et al. |
| 9,899,918 B2 | 2/2018 | Lee et al. |
| 10,050,515 B1 | 8/2018 | Chakraborty et al. |
| 10,075,080 B1 | 9/2018 | Scoones et al. |
| 10,476,390 B2 | 11/2019 | Petersen |
| 2017/0155324 A1 | 6/2017 | Choquet |
| 2017/0163157 A1 | 6/2017 | Petersen |
| 2017/0324326 A1 | 11/2017 | Liu et al. |
| 2018/0006559 A1 | 1/2018 | Chen et al. |
| 2018/0123451 A1 | 5/2018 | Larsen et al. |
| 2019/0334433 A1 | 10/2019 | Woo |
| 2019/0341850 A1 | 11/2019 | Macri |
| 2019/0372353 A1 | 12/2019 | Fu et al. |
| 2020/0295655 A1* | 9/2020 | Takahiro ............. H02M 3/1584 |

\* cited by examiner

SWITCHING REGULATOR GENERATING CONTINUOUS OUTPUT DELIVERY CURRENT AND OPERATING METHOD THEREOF

CROSS-REFERENCE TO RELATED APPLICATION

This application is a continuation of U.S. application Ser. No. 16/436,224, filed on Jun. 10, 2019, which claims the benefit of Korean Patent Application No. 10-2018-0134439, filed on Nov. 5, 2018, in the Korean Intellectual Property Office, the disclosure of each of which is incorporated herein in its entirety by reference.

BACKGROUND

Inventive concepts relate to generation of a supply voltage, and more particularly, to a switching regulator that generates a continuous output delivery current, and/or a method of operating the same.

A supply voltage may be generated to provide power to electronic components. The level of a supply voltage supplied to an electronic component may be changed to reduce power consumed by the electronic component. For example, in the case of a digital circuit that processes a digital signal, a low voltage supply level may be provided when relatively lower performance is required and/or desired, and a high voltage supply level may be provided when relatively higher performance is required and/or desired. Therefore, a switching regulator capable of generating supply voltages of various levels may be used, and the switching regulator may be required to generate a supply voltage that is rapidly changeable and has reduced noise.

SUMMARY

Inventive concepts provides a switching regulator that generates a supply voltage with reduced noise and provides improved operational reliability and efficiency, and/or a method of operating the switching regulator.

According to some example embodiments of inventive concepts, there is provided a switching regulator configured to generate an output voltage from an input voltage. The switching regulator comprises an inductor, an output capacitor configured to generate the output voltage based on a current passing through the inductor, a flying capacitor, and a plurality of switches. The plurality of switches are configured to operate in at least one of a buck-boost mode or a boost mode to, charge the flying capacitor to the input voltage in a first phase, and provide a boosted voltage from the flying capacitor to the inductor in a second phase, the boosted voltage being generated by charge pumping from the input voltage.

According to some example embodiments of inventive concepts, there is provided a switching regulator configured to generate an output voltage from an input voltage. The switching regulator comprises an inductor, an output capacitor configured to generate the output voltage based on a current passing through the inductor, a flying capacitor, and a plurality of switches. The plurality of switches are configured to operate in at least one of a buck-boost mode or a boost mode to, provide the input voltage or a ground voltage to the inductor in a first phase and provide a boosted voltage from the flying capacitor to the inductor in a second phase, the switching regulator configured to generate the boosted voltage by charge pumping from the input voltage.

According to some example embodiments of inventive concepts, there is provided a switching regulator comprising an input node, an output node, a first switch, a second switch, a third switch, and a fourth switch that are sequentially connected in series between the input node and a ground node, a fifth switch comprising one end connected to the input node and another end connected to the third switch and the fourth switch, an inductor comprising one end connected to the second switch and the third switch and another end connected to the output node, an output capacitor comprising one end connected to the output node and another end connected to the ground node, a flying capacitor comprising one end connected to the first switch and the second switch and another end connected to the third switch, the fourth switch, and the fifth switch, and a controller configured to control the first switch, the second switch, the third switch, the fourth switch, and the fifth switch.

According to some example embodiments of inventive concepts, there is provided a method of repeatedly operating periods of a switching regulator, each period comprising a plurality of phases. The method comprises, in a first phase, charging a flying capacitor to an input voltage, in a second phase subsequent to the first phase, boosting a voltage at a first end of the flying capacitor by charge pumping, and in the second phase, providing the boosted voltage to an inductor.

BRIEF DESCRIPTION OF THE DRAWINGS

Embodiments of inventive concepts will be more clearly understood from the following detailed description taken in conjunction with the accompanying drawings in which.

DETAILED DESCRIPTION OF EXAMPLE EMBODIMENTS

Figure 1:
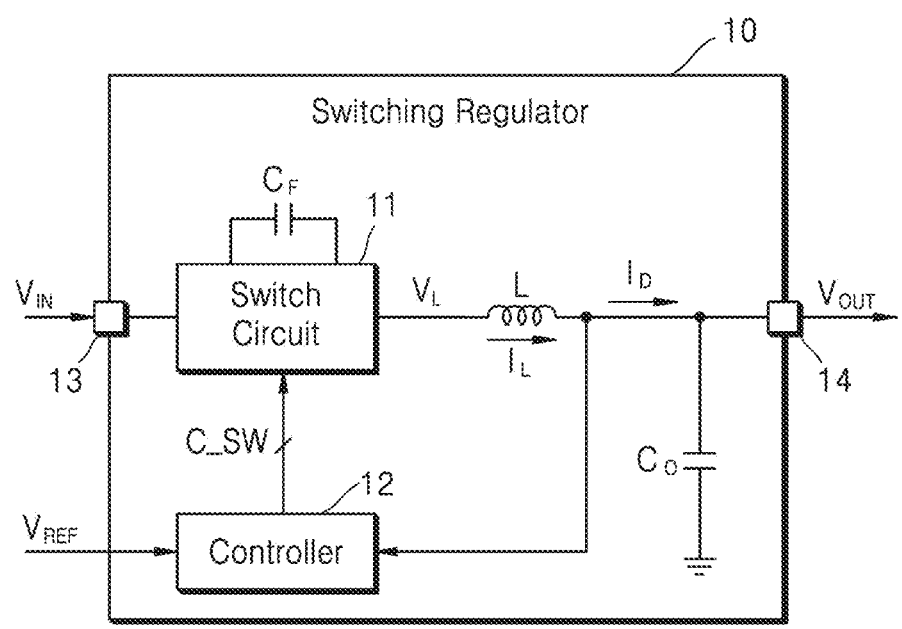
FIG. 1 is a block diagram showing a switching regulator according to some example embodiments.

FIG. 1 is a block diagram showing a switching regulator 10 according to some example embodiments. The switching regulator 10 may receive an input voltage $V_{IN}$ through an input node 13, and may output an output voltage $V_{OUT}$ through an output node 14. The output voltage $V_{OUT}$ may be used as a supply voltage for other electronic components and/or loads. As shown in FIG. 1, the switching regulator 10 may include a switch circuit 11, a controller 12, a flying capacitor $C_F$, an inductor L, and an output capacitor $C_O$. In some example embodiments, the elements included in the switching regulator 10 may be included in and/or integrated in one semiconductor package. In some example embodiments, the switching regulator 10 may include a printed circuit board (PCB), and at least two of the elements of the switching regulator 10 may be mounted on the PCB as separate semiconductor packages.

As used herein, the switching regulator 10 may refer to any electronic circuit that generates the output voltage $V_{OUT}$ by switching ON/OFF of a device. For example, the switch circuit 11 of the switching regulator 10 may toggle at least one switch between an ON state and OFF state. The at least one switch may toggled based on a switch control signal C_SW provided from the controller 12, thereby adjusting a path for an inductor current $I_L$ passing through the inductor L. As used herein, ON of a switch may refer to a state where both ends of the switch are electrically connected, and OFF of the switch may refer to a state where both ends of the switch are electrically disconnected. As used herein, two or more elements electrically connected via an ON switch and/or a conducting line may be referred to simply as being connected, whereas two or more elements electrically connected at all times through a conducting line or the like may be referred to as being coupled.

As described below with reference to FIG. 3, as an example of the switching regulator 10, a DC-DC converter may generate the output voltage $V_{OUT}$, which is a DC voltage, from the input voltage $V_{IN}$, which is a DC voltage. For example, a buck converter may generate the output voltage $V_{OUT}$ having a level lower than the level of the input voltage $V_{IN}$. Such a converter may be referred to as a step-down converter. A boost converter may generate the output voltage $V_{OUT}$ having a level higher than the level of the input voltage $V_{IN}$. Such a converter may be referred to as a step-up converter. A buck-boost (or step-up/down) converter may generate the output voltage $V_{OUT}$ having a level lower or higher than the level of the input voltage $V_{IN}$. Hereinafter, the switching regulator 10 will be described mainly with reference to a buck-boost DC-DC converter; however, inventive concepts are not limited thereto. For example, example embodiments may be applied to other types of the switching regulator 10 like an AC-DC converter in which the input voltage $V_{IN}$ is an AC voltage.

The switch circuit 11 may receive the switch control signal C_SW from the controller 12. The switch circuit 11 may include at least one switch that is turned ON/OFF according to the switch control signal C_SW. The switch circuit 11 may adjust the inductor current $I_L$ passing through the inductor L by adjusting a voltage provided to the inductor L based on the switch control signal C_SW. For example, the switch circuit 11 may enable the inductor current $I_L$ to charge the output capacitor $C_O$ in response to the switch control signal C_SW, and enable the inductor current $I_L$ to prevent or reduce the likelihood of the output capacitor $C_O$ from being overcharged in response to the switch control signal C_SW. In the switch circuit 11, when there is a load (e.g., LD in FIG. 3) that receives the output voltage $V_{OUT}$ from the switching regulator 10, at least a portion of the inductor current $I_L$ may be provided to the load. An example of the switch circuit 11 will be described below with reference to FIG. 3.

As shown in FIG. 1, the inductor L and the output capacitor $C_O$ may be connected in series, and thus the inductor current $I_L$ and an output delivery current $I_D$ may be substantially identical to each other, i.e. may be substantially identical to each other when a current flowing to the controller 12 is ignored, e.g. small enough to be ignored. The inductor current $I_L$ may depend on a voltage applied to the inductor L by the switch circuit 11 (i.e., $V_L$ in FIG. 1). Herein, a voltage at a node to which the switch circuit 11 and the inductor L are connected may be referred to as an inductor voltage $V_L$. In some example embodiments, the capacitance of the output capacitor $C_O$ may be determined based on a current supplied to a load connected to the output node 14 of the switching regulator 10 (or a current consumed by the load). Furthermore, in some example embodiments, the inductance of the inductor L may be determined, e.g. determined when designing the switching regulator 10, based on the capacitance of the output capacitor $C_O$ and/or switching frequency. In some example embodiments, the capacitance of the flying capacitor $C_F$ may be determined, e.g. determined when designing the switching regulator 10, based on a current provided to a load, the switching frequency, the input voltage $V_{IN}$, and/or the output voltage $V_{OUT}$.

The controller 12 may generate the switch control signal C_SW based on a reference voltage $V_{REF}$ and the output voltage $V_{OUT}$. For example, the controller 12 may generate a feedback voltage by dividing the output voltage $V_{OUT}$ through two or more resistors, and compare the feedback voltage with the reference voltage $V_{REF}$, thereby generating the switch control signal C_SW, such that the feedback voltage is equal to the reference voltage $V_{REF}$. Accordingly, the level of the output voltage $V_{OUT}$ may be determined based on the level of the reference voltage $V_{REF}$, and the level of the output voltage $V_{OUT}$ may be changed by changing the level of the reference voltage $V_{REF}$. In some example embodiments, the controller 12 may sense a current of an output node, e.g., the inductor current $I_L$ or the output delivery current $I_D$, to perform the above-described operations, and may also generate the switch control signal C_SW based on the magnitude of a detected current. Alternatively or additionally, in some example embodiments, the controller 12 may generate the switch control signal C_SW based on both the output voltage $V_{OUT}$ and the current of the output node. In some example embodiments, the controller 12 may include at least one comparator and at least one logic gate.

In some example embodiments, the switching regulator 10 may be set to one of a buck mode, a buck-boost mode or a boost mode according to a target level of the output voltage $V_{OUT}$. For example, the controller 12 may set the mode of the switching regulator 10 based on the input voltage $V_{IN}$ and the reference voltage $V_{REF}$. In some example embodiments, the controller 12 may set the switching regulator 10 to the buck mode when the level of the output voltage $V_{OUT}$ is lower than about 90% of that of the input voltage $V_{IN}$, set the switching regulator 10 to the boost mode when the level of the output voltage $V_{OUT}$ is higher than about 110% of that of the input voltage $V_{IN}$, and set the switching regulator 10 to the buck-boost mode when the level of the output voltage $V_{OUT}$ is greater than or equal to about 90% of that of the input voltage $V_{IN}$ and is lower than or equal to about 110% of that of the input voltage $V_{IN}$. Since the switching regulator 10 supports all of the buck mode, the buck-boost mode, and the boost mode, the level of the output voltage $V_{OUT}$ may vary over a wide range.

The controller 12 may generate the switch control signal C_SW, such that the switch circuit 11 and the flying capacitor $C_F$ connected to the switch circuit 11 function as a charge pump. The inductor voltage $V_L$ boosted by the charge pump may be provided to the inductor L in some of phases included in a switching period. In some example embodiments, a boosted voltage may be approximately twice the input voltage $V_{IN}$. Accordingly, as described below with reference to FIG. 5, the output delivery current $I_D$ provided to the output capacitor $C_O$ and a load may vary continuously. As described below, the output delivery current $I_D$ provided to the output capacitor $C_O$ and the load LD in the buck-boost converter of FIGS. 2A and 2B may be rapidly changed at every switching period, and thus, the switching regulator 10 may have undesirable characteristics. Therefore, cost and complexity to resolve the undesirable characteristics may increase. However, the continuously varying output delivery current $I_D$ in the switching regulator 10 may enable the output voltage $V_{OUT}$ to be quickly changed and have reduced noise. Furthermore, due to the peak current of the output delivery current $I_D$ being lower than the peak current of a discontinuous output delivery current, devices, e.g., the inductor L and the output capacitor $C_O$, may have small capacities and/or reduced sizes. Therefore, the controller 12 may be reduced in size, e.g. miniaturized, and may be easily integrated with other circuits.

The output voltage $V_{OUT}$ generated by the switching regulator 10 may function as a supply voltage that provides power to electronic components, and such electronic components may be referred to as loads of the switching regulator 10. For example, the output voltage $V_{OUT}$ may be provided to a digital circuit for processing a digital signal, an analog circuit for processing an analog signal, and/or an RF circuit for processing an RF signal. To prevent or reduce the likelihood of malfunction of a load, the output voltage $V_{OUT}$ may be required to have reduced noise. In particular, the output voltage $V_{OUT}$ may be required to reduce a ripple due to a switching operation of the switching regulator 10. Alternatively or additionally, the level of the output voltage $V_{OUT}$ may be dynamically changed to reduce power consumption of a load. For example, the switching regulator 10 may provide the output voltage $V_{OUT}$ having a low level to a load when low performance or low power consumption is required and/or desired and may provide the output voltage $V_{OUT}$ having a high level to the load when high performance or high power consumption is required and/or desired. Therefore, increased capacitance of the output capacitor $C_O$ may be required and/or desired to reduce the ripple of the output voltage $V_{OUT}$, while reduced capacitance may be required and/or desired to quickly change the level of the output voltage $V_{OUT}$. As described above, the switching regulator 10 may generate the output voltage $V_{OUT}$ with a reduced ripple due to the continuous output delivery current $I_D$. Therefore, the capacitance of the output capacitor $C_O$ may be reduced. As a result, the level of the output voltage $V_{OUT}$ may be quickly changed and the switching regulator 10 may be reduced in size, e.g. miniaturized.

Figure 2A:
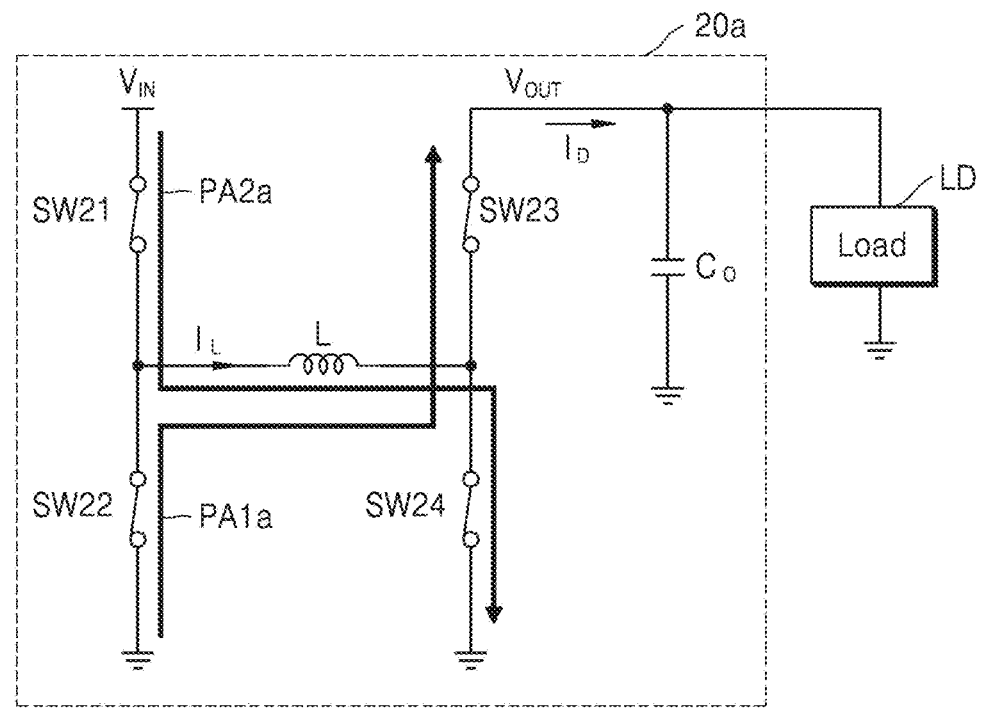
FIGS. 2A and 2B are diagrams showing switching regulators according to comparative examples.
Figure 2A:
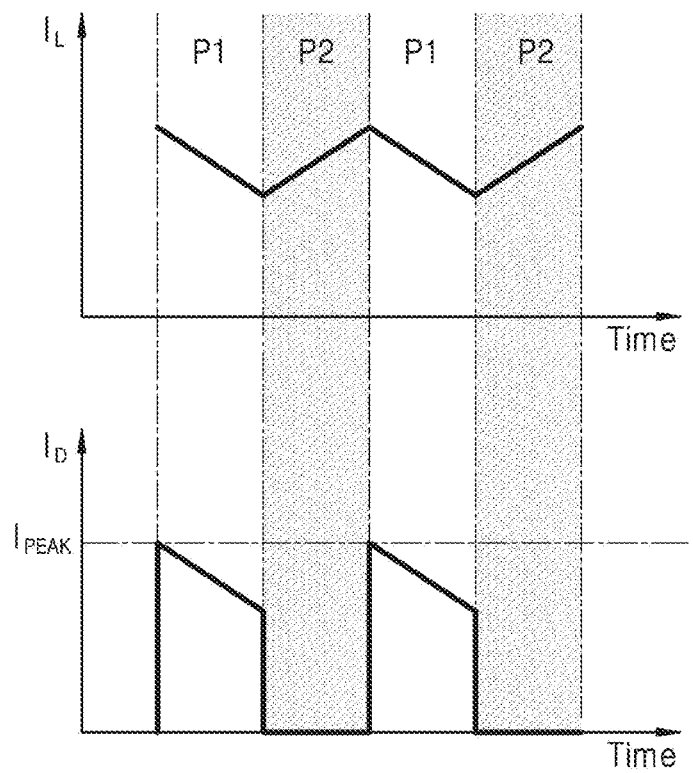
Figure 2B:
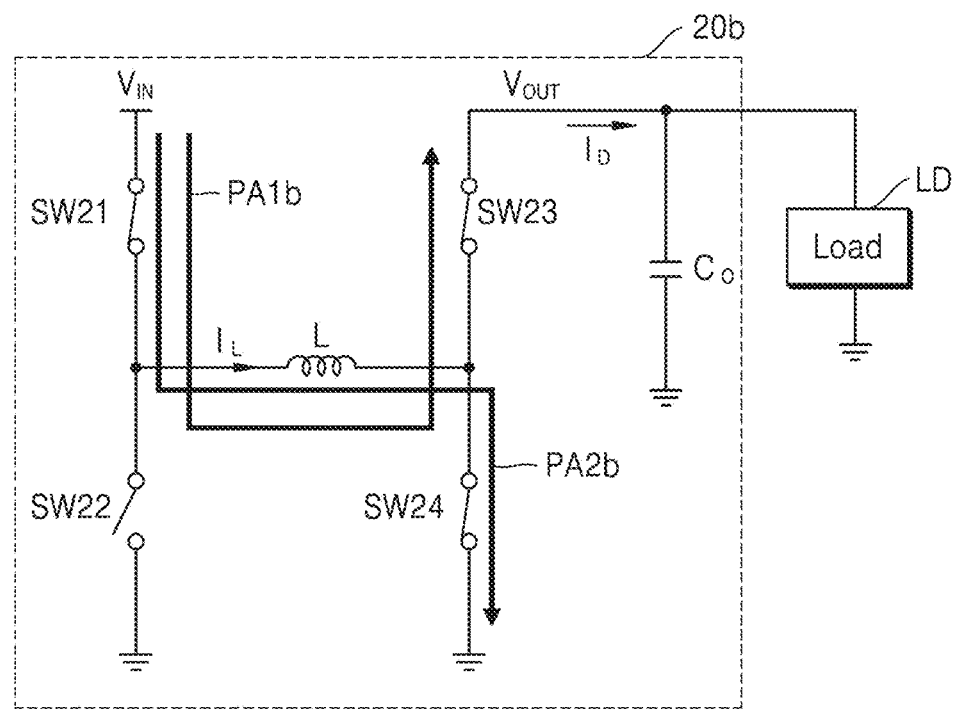
Figure 2B:
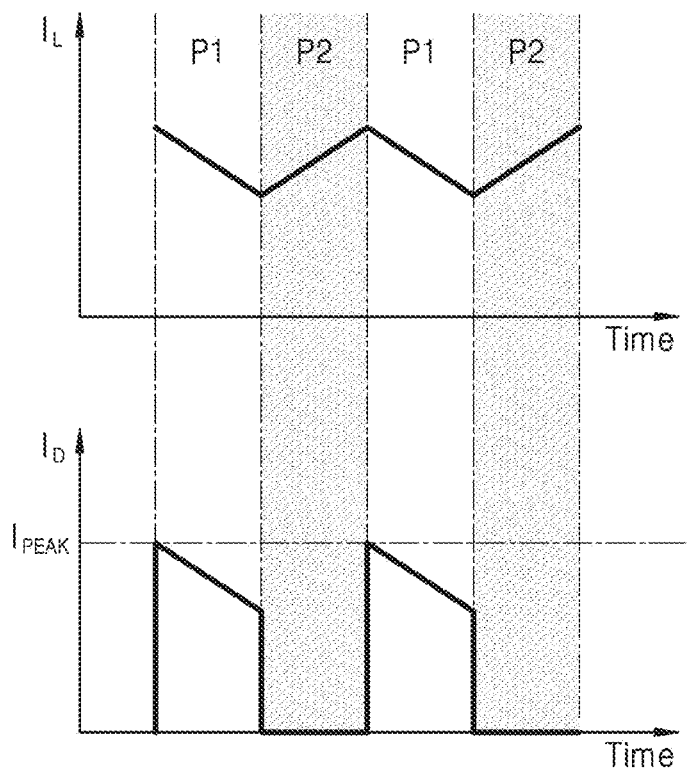

FIGS. 2A and 2B are diagrams showing switching regulators according to comparative examples. In detail, FIG. 2A illustrates a circuit diagram of a switching regulator 20a in the buck-boost mode and a timing diagram showing an operation thereof, and FIG. 2B illustrates a circuit diagram of a switching regulator 20b in the boost mode and a timing diagram showing an operation thereof. In the drawings included herein, the durations of phases in a switching period are illustrated to be substantially the same. However, it is merely for convenience of illustration, and the durations of the phases may be different from one another. Hereinafter, descriptions duplicated with those already given above will be omitted.

Referring to FIG. 2A, the switching regulator 20a may include a first switch SW21, a second switch SW22, a third switch SW23, and a fourth switch SW24, an inductor L, and an output capacitor $C_O$. A load LD may be connected to the switching regulator 20a. The switching regulator 20a may support a buck mode, a buck-boost mode, and/or a boost mode, and each of the first switch SW21, the second switch SW22, the third switch SW23, and the fourth switch SW24 may be turned ON/OFF based on a mode. For example, as shown in FIG. 2A, in the buck-boost mode, each of the first switch SW21, the second switch SW22, the third switch SW23, and the fourth switch SW24 may be turned ON/OFF based on a first phase P1 and a second phase P2 in a switching period.

In the first phase P1, the second switch SW22 and the third switch SW23 may be turned ON and the first switch SW21 and the fourth switch SW24 may be turned OFF, as indicated by a first path PA1a in the circuit diagram of FIG. 2A. Accordingly, the inductor current $I_L$ may flow from a ground node to the output capacitor $C_O$ and the load LD through the second switch SW22, the inductor L, and the third switch SW23. As shown in the timing diagram of FIG. 2A, in the first phase P1, the inductor current $I_L$ may be gradually decreased and the output delivery current $I_D$ may also be decreased.

In the second phase P2, the first switch SW21 and the fourth switch SW24 may be turned ON and the second switch SW22 and the third switch SW23 may be turned OFF, as indicated by a second path PA2a in the circuit diagram of FIG. 2A. Therefore, the inductor current $I_L$ may flow from an input node to the ground node through the first switch SW21, the inductor L, and the fourth switch SW24. As shown in the timing diagram of FIG. 2A, the inductor current $I_L$ may be gradually increased in the second phase P2, while the output delivery current $I_D$ may become zero or approximately zero by the third switch SW23 that is turned OFF. Therefore, as shown in the timing diagram of FIG. 2A, the inductor current $I_L$ may be continuous, whereas the output delivery current $I_D$ may be discontinuous. Furthermore, the output delivery current $I_D$ may have a high peak value $I_{PEAK}$ for a desired level of the output voltage $V_{OUT}$.

Referring to FIG. 2B, in the switching regulator 20b of the boost mode, the second switch SW22 may be turned OFF and the first switch SW21, the third switch SW23, and the fourth switch SW24 may be turned ON or OFF in a switching period according to the first phase P1 and the second phase P2.

In the first phase P1, the first switch SW21 and the third switch SW23 may be turned ON and the second switch SW22 and the fourth switch SW24 may be turned OFF, as indicated by a first path PA1b in the circuit diagram of FIG. 2B. Accordingly, the inductor current $I_L$ may flow from the input node to the output capacitor $C_O$ and the load LD via the first switch SW21, the inductor L, and the third switch SW23. As shown in the timing diagram of FIG. 2B, in the first phase P1, the inductor current $I_L$ may be gradually decreased and the output delivery current $I_D$ may also be decreased.

In the second phase P2, the first switch SW21 and the fourth switch SW24 may be turned ON and the second switch SW22 and the third switch SW23 may be turned OFF, as indicated by a first path PA2b in the circuit diagram of FIG. 2B. Therefore, the inductor current $I_L$ may flow from an input node to the ground node through the first switch SW21, the inductor L, and the fourth switch SW24. As shown in the timing diagram of FIG. 2B, the inductor current $I_L$ may be gradually increased in the second phase P2 while the output delivery current $I_D$ may become zero or approximately zero by the third switch SW23 that is turned OFF. Therefore, as shown in the timing diagram of FIG. 2B, the inductor current $I_L$ may be continuous, whereas the output delivery current $I_D$ may be discontinuous. Furthermore, the output delivery current $I_D$ may have a high peak value $I_{PEAK}$ for a desired level of the output voltage $V_{OUT}$.

Figure 3:
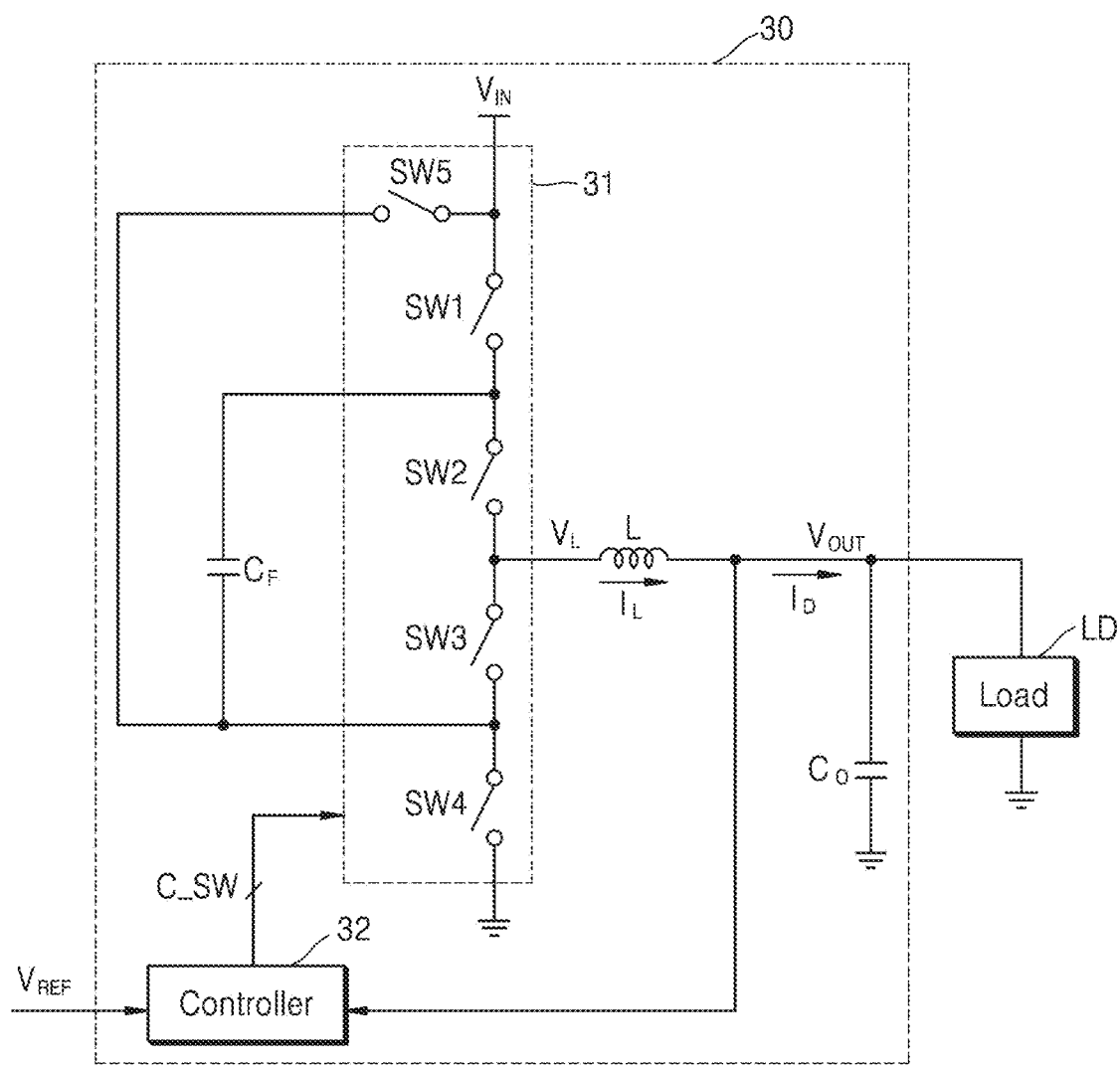
FIG. 3 is a circuit diagram showing a switching regulator according to some example embodiments.

FIG. 3 is a circuit diagram showing a switching regulator 30 according to some example embodiments. Similar to the switching regulator 10 of FIG. 1, the switching regulator 30 of FIG. 3 may include a switch circuit 31, a controller 32, a flying capacitor $C_F$, the inductor L, and the output capacitor $C_O$. The load LD may be connected to the switching regulator 30. Hereinafter, descriptions duplicated with those already given above may be omitted.

The switch circuit 31 may include a first switch SW1, a second switch SW2, a third switch SW3, a fourth switch SW4, and a fifth switch SW5. As shown in FIG. 3, the first switch SW1, the second switch SW2, the third switch SW3, and the fourth switch SW4 may be connected in series between an input node (illustrated in FIG. 3 as connected to $V_{IN}$) and a ground node The fifth switch SW5 may be connected to, e.g. coupled with, the input node via one end and connected to, e.g. coupled with, the third switch SW3 and the fourth switch SW4 via another end. Switches shown in FIG. 3 may have any structure for electrically connecting or disconnecting both ends according to the switch control signal C_SW provided from the controller 32. A switch may be referred to as a power switch. In some example embodiments, a switch may include at least one of an N-channel field effect transistor (NFET) or a P-channel field effect transistor (PFET) having a gate to which the switch control signal C_SW is applied. Alternatively or additionally, a switch may include at least one NFET and/or at least one PFET that are connected to each other in series or in parallel. Alternatively or additionally, in some example embodiments, a switch may include at least one other type of transistor, e.g., a bipolar junction transistor (BJT).

The flying capacitor $C_F$ may be connected to, e.g. coupled with, the first switch SW1 and the second switch SW2 via one end and connected to, e.g. coupled with, the third switch SW3 and the fourth switch SW4 via another end. As described below with reference to the drawings, the controller 32 may generate the switch control signal C_SW, such that the first switch SW1, the second switch SW2, the third switch SW3, the fourth switch SW4, and the fifth switch SW5 and the flying capacitor $C_F$ function as a charge pump. The controller 32 may also generate the switch control signal C_SW to apply the inductor voltage $V_L$ to the inductor L, where the inductor voltage $V_L$ is boosted by the charge pump. Therefore, the output delivery current $I_D$ provided to the output capacitor $C_O$ may be continuous. The switching regulator 30 may have improved characteristics. Hereinafter, example embodiments will be described with reference to the switching regulator 30 of FIG. 3.

Figure 4A:
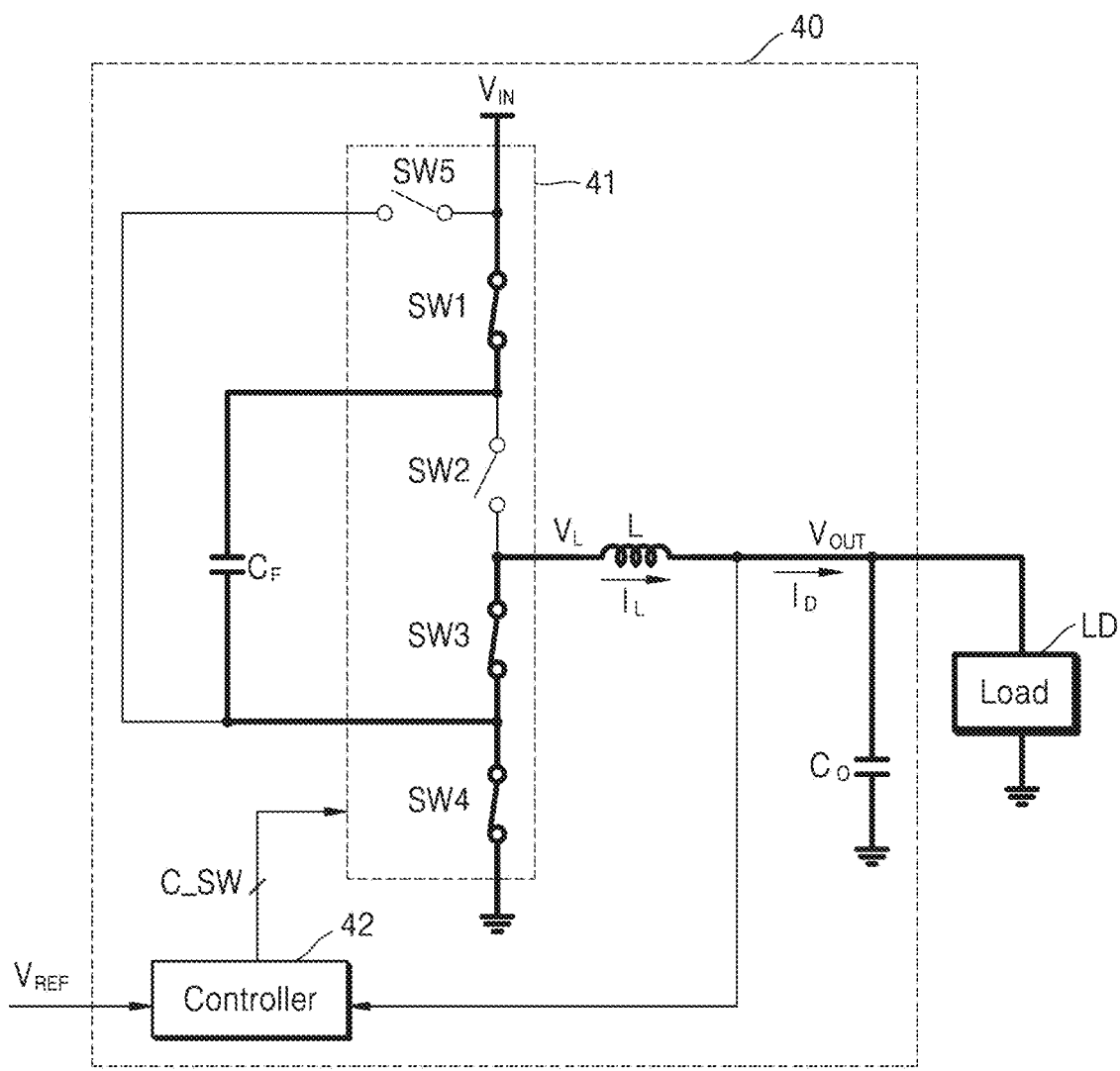
FIGS. 4A and 4B are circuit diagrams showing a switching regulator in a buck-boost mode according to some example embodiments.
Figure 4B:
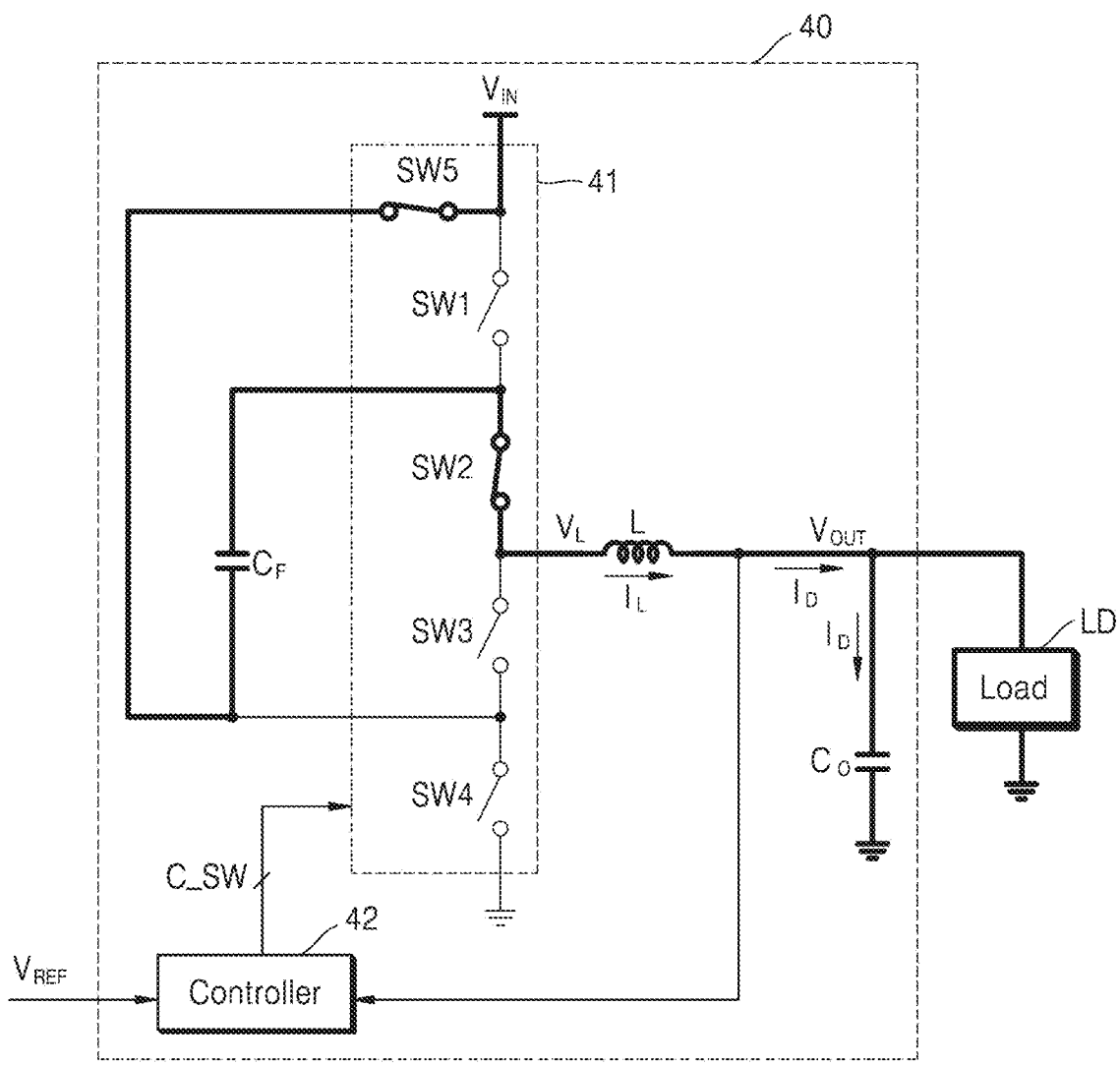
Figure 5:
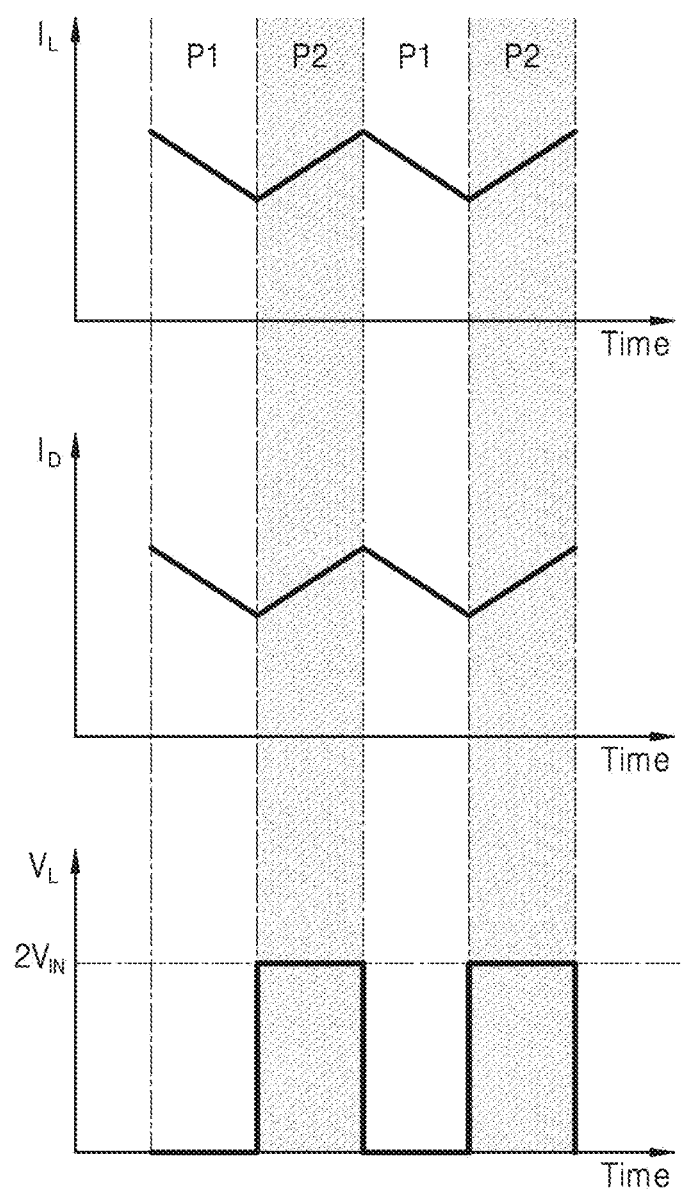
FIG. 5 is a timing diagram showing an example of an operation of the switching regulator of FIGS. 4A and 4B according to example embodiments.

FIGS. 4A and 4B are circuit diagrams showing a switching regulator 40 in a buck-boost mode according to some example embodiments, and FIG. 5 is a timing diagram showing an example of an operation of the switching regulator 40 of FIGS. 4A and 4B according to example embodiments. In detail, FIG. 4A shows the switching regulator 40 in the first phase P1 and FIG. 4B shows the switching regulator 40 in the second phase P2. In FIG. 4A and FIG. 4B, paths in which a current flows and switches that are turned ON are shown in bold.

Referring to FIG. 4A, similar to the switching regulator 30 of FIG. 3, the switching regulator 40 may include a switch circuit 41, a controller 42, the flying capacitor $C_F$, the inductor L, and the output capacitor $C_O$. The switch circuit 41 may include the first switch SW1, the second switch SW2, the third switch SW3, the fourth switch SW4, and the fifth switch SW5, and a load LD may be connected to the switching regulator 30. In the buck-boost mode in the first phase P1, the controller 42 may generate the switch control signal C_SW to turn ON the first switch SW1, the third switch SW3, and the fourth switch SW4 and turn OFF the second switch SW2 and the fifth switch SW5. In some example embodiments, in the buck-boost mode, the switching regulator 40 may generate the output voltage $V_{OUT}$ having a level similar to that of the input voltage $V_{IN}$.

Both ends of the flying capacitor $C_F$ may be connected to an input node and a ground node, respectively, e.g. when both the first switch SW1 and the fourth switch SW4 are ON. The flying capacitor $C_F$ may be charged to the input voltage $V_{IN}$. In addition, the inductor current $I_L$ may flow from the ground node to the output capacitor $C_O$ and the load LD through the fourth switch SW4 and the third switch SW3 and the inductor L. Accordingly, as shown in FIG. 5, the inductor current $I_L$ may be gradually decreased, and the output delivery current $I_D$ may also be gradually decreased. In addition, the inductor voltage $V_L$ may be identical to a ground voltage due to the third switch SW3 and the fourth switch SW4 that are turned ON.

Referring to FIG. 4B, in the buck-boost mode, in the second phase P2 the controller 42 may generate the switch control signal C_SW to turn ON the second switch SW2 and the fifth switch SW5 and turn OFF the first switch SW1, the third switch SW3, and the fourth switch SW4. From between the both ends of the flying capacitor $C_F$ that is charged by the input voltage $V_{IN}$ in the first phase P1, an end having higher potential may be disconnected from the input node by the first switch SW1, whereas another end having lower potential may be connected to the input node via the fifth switch SW5. Therefore, a boosted voltage, e.g., a voltage that is approximately twice the input voltage $V_{IN}$, may be provided to the inductor L via the second switch SW2 that is turned ON.

The inductor current $I_L$ may flow from the flying capacitor $C_F$ to the output capacitor $C_O$ and the load LD through the second switch SW2 and the inductor L. Accordingly, as shown in FIG. 5, the inductor current $I_L$ may be gradually increased, and the output delivery current $I_D$ may also be gradually increased. As a result, the output delivery current $I_D$ may vary continuously during a switching period including the first phase P1 and the second phase P2. That is, the output delivery current $I_D$ may vary in a manner different from that shown in the example shown in FIG. 2A. Also, in the second phase P2, the inductor voltage $V_L$ may correspond to a boosted voltage, which is approximately twice the input voltage $V_{IN}$. Although it is illustrated that the inductor voltage $V_L$ is maintained constant during the second phase P2 for convenience of illustration, in some example embodiments, the inductor voltage $V_L$ may slightly drop during the second phase P2.

In the examples described above with reference to FIGS. 4A, 4B, and 5, voltages across devices included in the switching regulator 40 may be limited to voltages around the input voltage $V_{IN}$. For example, as shown in FIG. 4B, in the second phase P2, in spite of the inductor voltage $V_L$ corresponding to the boosted voltage that is twice the input voltage $V_{IN}$, the maximum of voltages across the second switch SW2, the third switch SW3, the inductor L, and the flying capacitor $C_F$ may be a voltage around the input voltage $V_{IN}$. Accordingly, a high-voltage device may be omitted in the switching regulator 40. As a result, the switching regulator 40 may be manufactured at a reduced cost and may include relatively small-sized devices.

Figure 6:
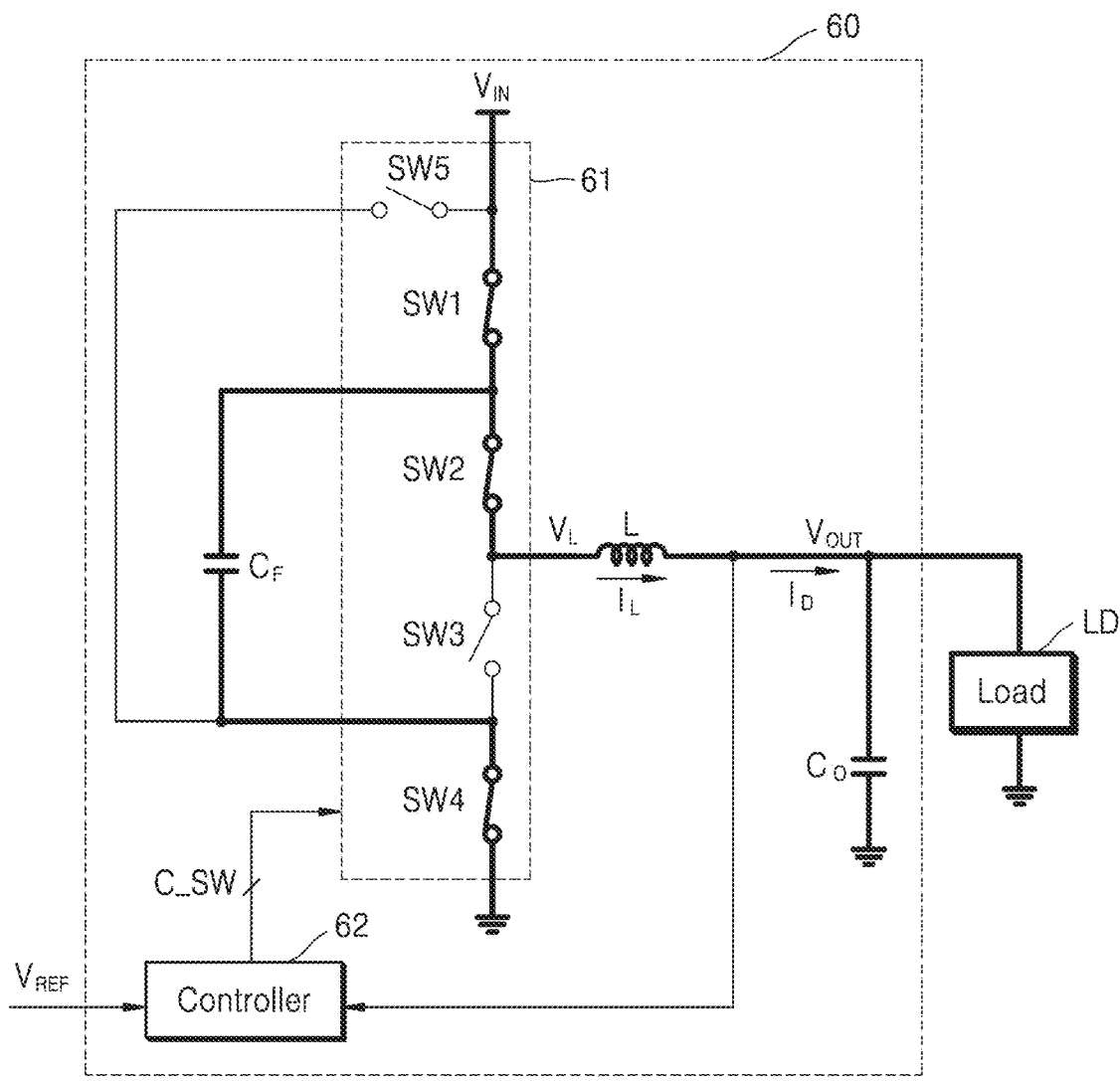
FIG. 6 is a circuit diagram showing a switching regulator in a buck-boost mode according to some example embodiments.
Figure 7:
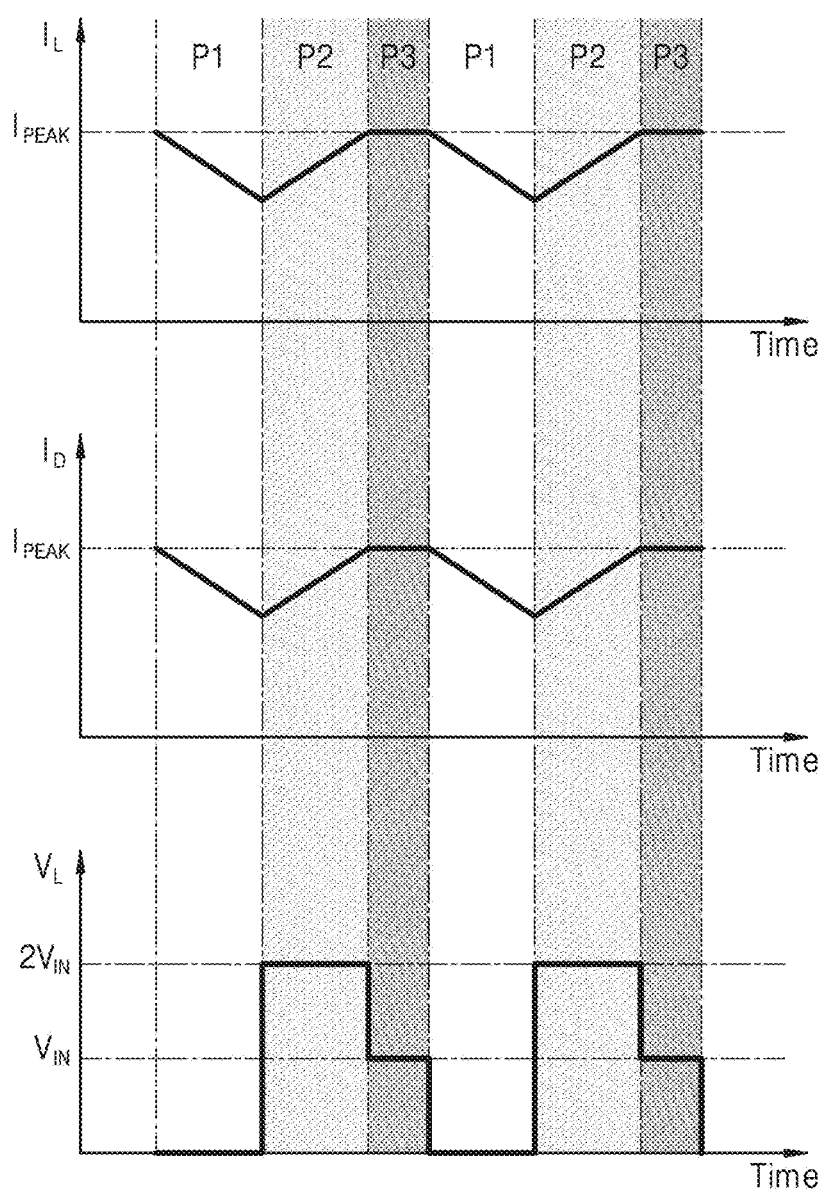
FIG. 7 is a timing diagram showing an example of an operation of the switching regulator of FIG. 6 according to some example embodiments.

FIG. 6 is a circuit diagram showing a switching regulator 60 in a buck-boost mode according to some example embodiments, and FIG. 7 is a timing diagram showing an example of an operation of the switching regulator 60 of FIG. 6 according to some example embodiments. In detail, FIG. 6 shows the switching regulator 60 in a third phase P3 subsequent to the second phase P2 in a switching period, and paths in which a current flows and switches that are turned ON are shown in bold in FIG. 6. Descriptions duplicated with those already given above with reference to FIGS. 4A, 4B, and 5 may be omitted.

Referring to FIG. 6A, similar to the switching regulator 30 of FIG. 3, the switching regulator 60 may include a switch circuit 61, a controller 62, the flying capacitor $C_F$, the inductor L, and the output capacitor $C_O$. The switch circuit 61 may include the first switch SW1, the second switch SW2, the third switch SW3, the fourth switch SW4, and the fifth switch SW5. A load LD may be connected to the switching regulator 60. In the buck-boost mode, the switching regulator 60 may operate according to a switching period having three phases, for example, the first phase P1, the second phase P2, and the third phase P3. Similar to the controller 42 described above with reference to FIGS. 4A and 4B, the controller 62 may generate the switch control signal C_SW for controlling the first switch SW1, the second switch SW2, the third switch SW3, the fourth switch SW4, and the fifth switch SW5.

The controller 62 may generate the switch control signal C_SW to turn ON the first switch SW1, the second switch SW2, and the fourth switch SW4 and turn OFF the third switch SW3 and the fifth switch SW5 in third phase P3. Therefore, the flying capacitor $C_F$ may be charged to the input voltage $V_{IN}$, and the inductor current $I_L$ may flow from an input node to the output capacitor $C_O$ and the load LD through the first switch SW1, the second switch SW2, and the inductor L. Therefore, as shown in FIG. 7, the inductor current $I_L$ and the output delivery current $I_D$ may be maintained substantially constant in the third phase P3. As a result, the inductor current $I_L$ and the output delivery current $I_D$ may each have a reduced peak value $I_{PEAK}$. Furthermore, the output delivery current $I_D$ may vary continuously during a switching period, which includes the first phase P1, the second phase P2, and the third phase P3, in a manner different from that shown in the example shown in FIG. 2A. Furthermore, the inductor voltage $V_L$ may be identical to the input voltage $V_{IN}$ due to the first switch SW1 and the second switch SW2 that are turned ON. Also, similar to the switching regulator 40 of FIGS. 4A and 4B, voltages applied to devices included in the switching regulator 60 in the third phase P3 may also be limited to a voltage around the input voltage $V_{IN}$.

Figure 8A:
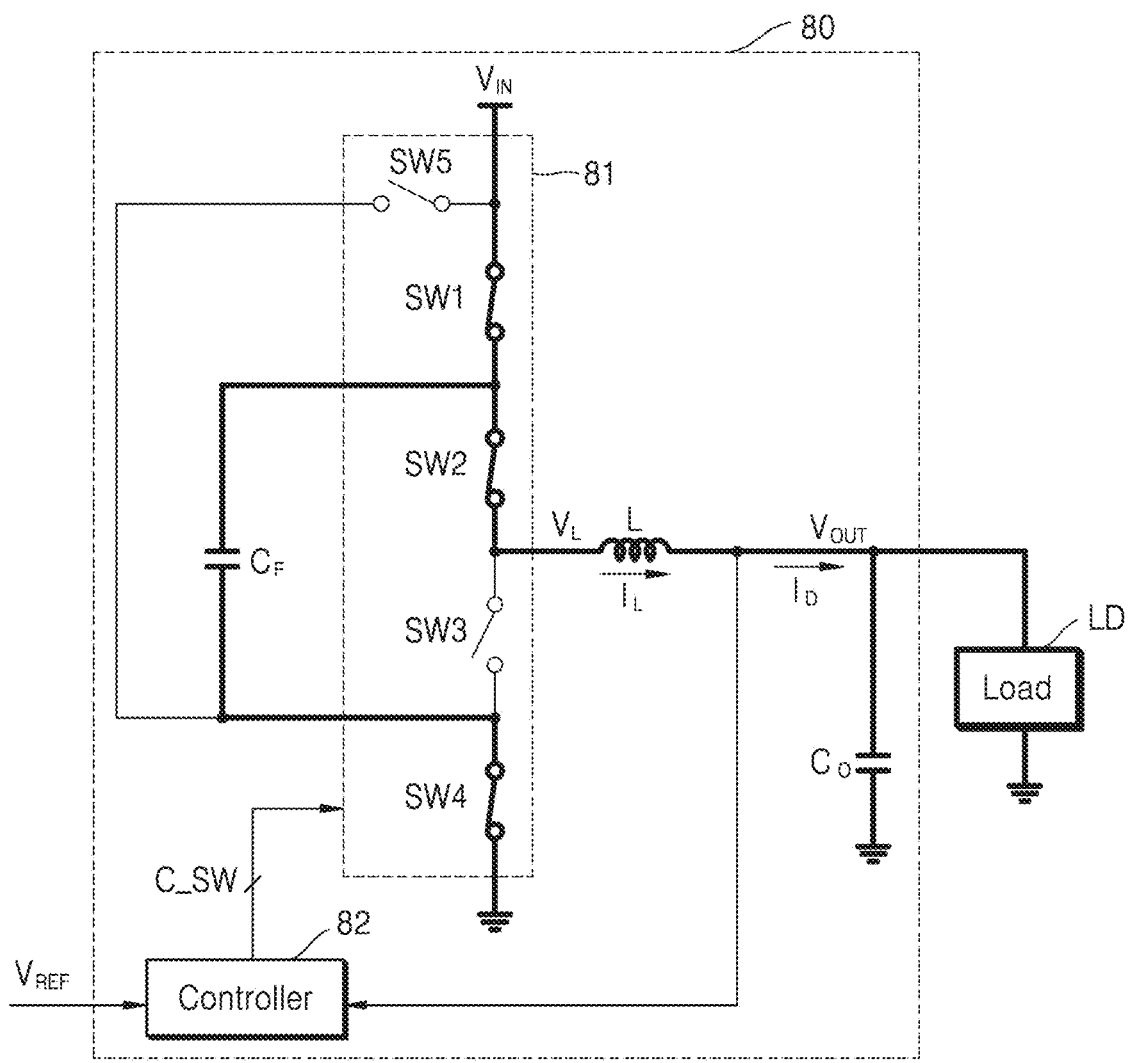
FIGS. 8A and 8B are circuit diagrams showing a switching regulator in a boost mode according to some example embodiments.
Figure 8B:
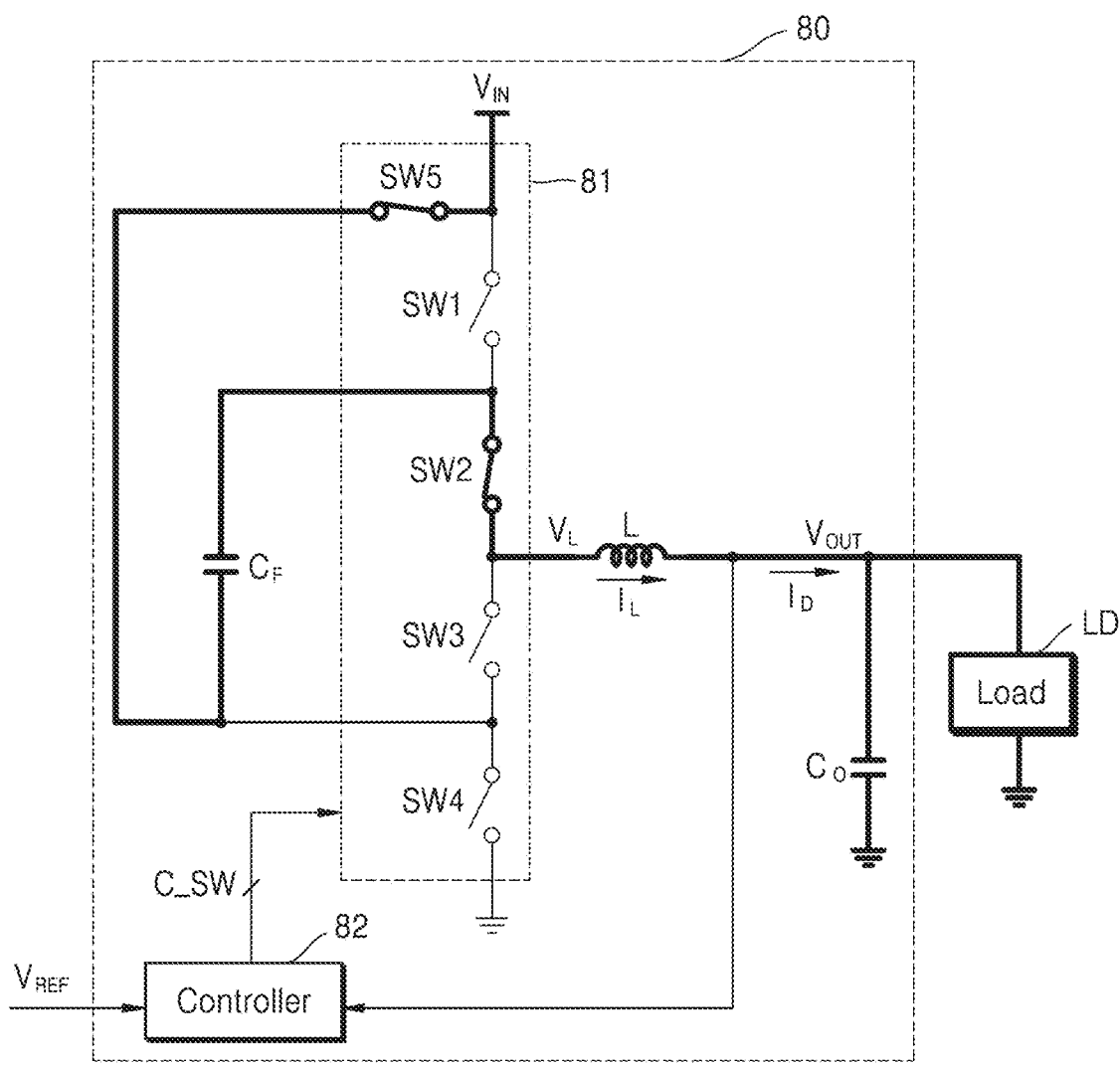
Figure 9:
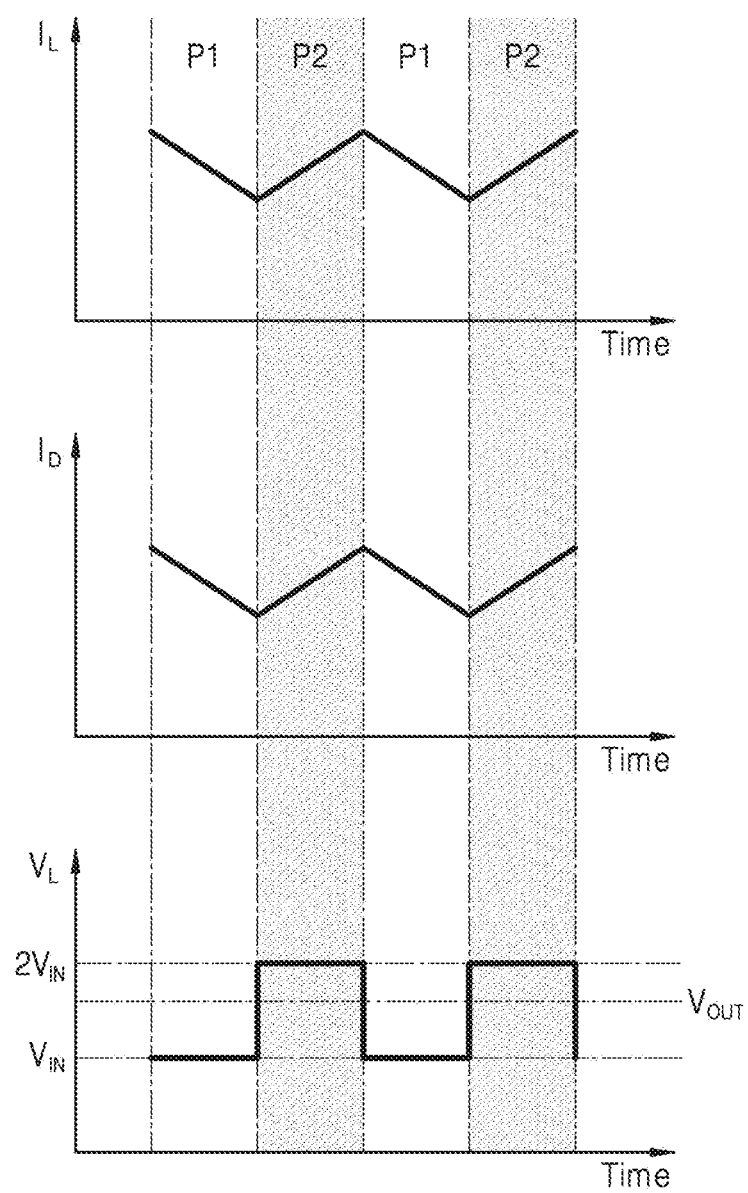
FIG. 9 is a timing diagram showing an example of an operation of the switching regulator of FIGS. 8A and 8B according to example embodiments.

FIGS. 8A and 8B are circuit diagrams showing a switching regulator 80 in a boost mode according to some example embodiments, and FIG. 9 is a timing diagram showing an example of an operation of the switching regulator 80 of FIGS. 8A and 8B according to some example embodiments. In detail, FIG. 8A shows the switching regulator 80 in the first phase P1 and FIG. 8B shows the switching regulator 80 in the second phase P2. In FIG. 8A and FIG. 8B, paths in which a current flows and switches that are turned ON are shown in bold. In some example embodiments, in the boost mode, the switching regulator 80 may generate the output voltage $V_{OUT}$ that is greater than the input voltage $V_{IN}$. For example, as shown in FIG. 9, the output voltage $V_{OUT}$ may be greater than the input voltage $V_{IN}$ and less than twice the input voltage $V_{IN}$.

Referring to FIG. 8A, similar to the switching regulator 30 of FIG. 3, the switching regulator 80 may include a switch circuit 81, a controller 82, the flying capacitor $C_F$, the inductor L, and the output capacitor $C_O$. The switch circuit 81 may include the first switch SW1, the second switch SW2, the third switch SW3, the fourth switch SW4, and the fifth switch SW5. The load LD may be connected to the switching regulator 80. In the boost mode, the controller 82 may generate the switch control signal C_SW to turn ON the first switch SW1, in the first phase P1 the second switch SW2, and the fourth switch SW4 and turn OFF the third switch SW3 and the fifth switch SW5.

Both ends of the flying capacitor $C_F$ may be connected to an input node and a ground node, respectively, and the flying capacitor $C_F$ may be charged to the input voltage $V_{IN}$. In addition, the inductor current $I_L$ may flow from the input node to the output capacitor $C_O$ and the load LD through the first switch SW1 and the second switch SW2 and the inductor L. In the boost mode, the output voltage $V_{OUT}$ may be higher than the input voltage $V_{IN}$, and thus, as shown in FIG. 9, the inductor current $I_L$ may gradually drop and the output delivery current $I_D$ may also drop. In addition, the inductor voltage $V_L$ may be identical to the input voltage $V_{IN}$ due to the first switch SW1 and the second switch SW2 that are turned ON.

Referring to FIG. 8B, in the boost mode, in the second phase P2 the controller 82 may generate the switch control signal C_SW to turn ON the second switch SW2 and the fifth switch SW5 and turn OFF the first switch SW1, the third switch SW3, and the fourth switch SW4. Therefore, in the boost mode, the third switch SW3 may be turned OFF. Similar to the description given above with reference to FIG. 4B, the inductor voltage $V_L$ corresponding to a boosted voltage, e.g., a voltage about twice the input voltage $V_{IN}$, may be provided to the inductor L through the second switch SW2 that is turned ON.

The inductor current $I_L$ may flow from the flying capacitor $C_F$ to the output capacitor $C_O$ and the load LD through the second switch SW2 and the inductor L. Accordingly, as shown in FIG. 9, the inductor current $I_L$ may be gradually increased, and the output delivery current $I_D$ may also be gradually increased. As a result, the output delivery current $I_D$ may vary continuously during a switching period including the first phase P1 and the second phase P2, in a manner different from that shown in the example shown in FIG. 2B. Also, in the second phase P2, the inductor voltage $V_L$ may correspond to a boosted voltage, which is approximately twice the input voltage $V_{IN}$. Although it is illustrated that the inductor voltage $V_L$ is maintained constant during the second phase P2 for convenience of illustration, in some example embodiments, the inductor voltage $V_L$ may slightly drop during the second phase P2.

In the examples described above with reference to FIGS. 8A, 8B, and 9, voltages across devices included in the switching regulator 80 may be limited to voltages around the input voltage $V_{IN}$. For example, as shown in FIG. 8B, in the second phase P2, in spite of the inductor voltage $V_L$ corresponding to the boosted voltage that is twice the input voltage $V_{IN}$, the maximum of voltages across the second switch SW2, the third switch SW3, the inductor L, and the flying capacitor $C_F$ may be a voltage around the input voltage $V_{IN}$.

Figure 10A:
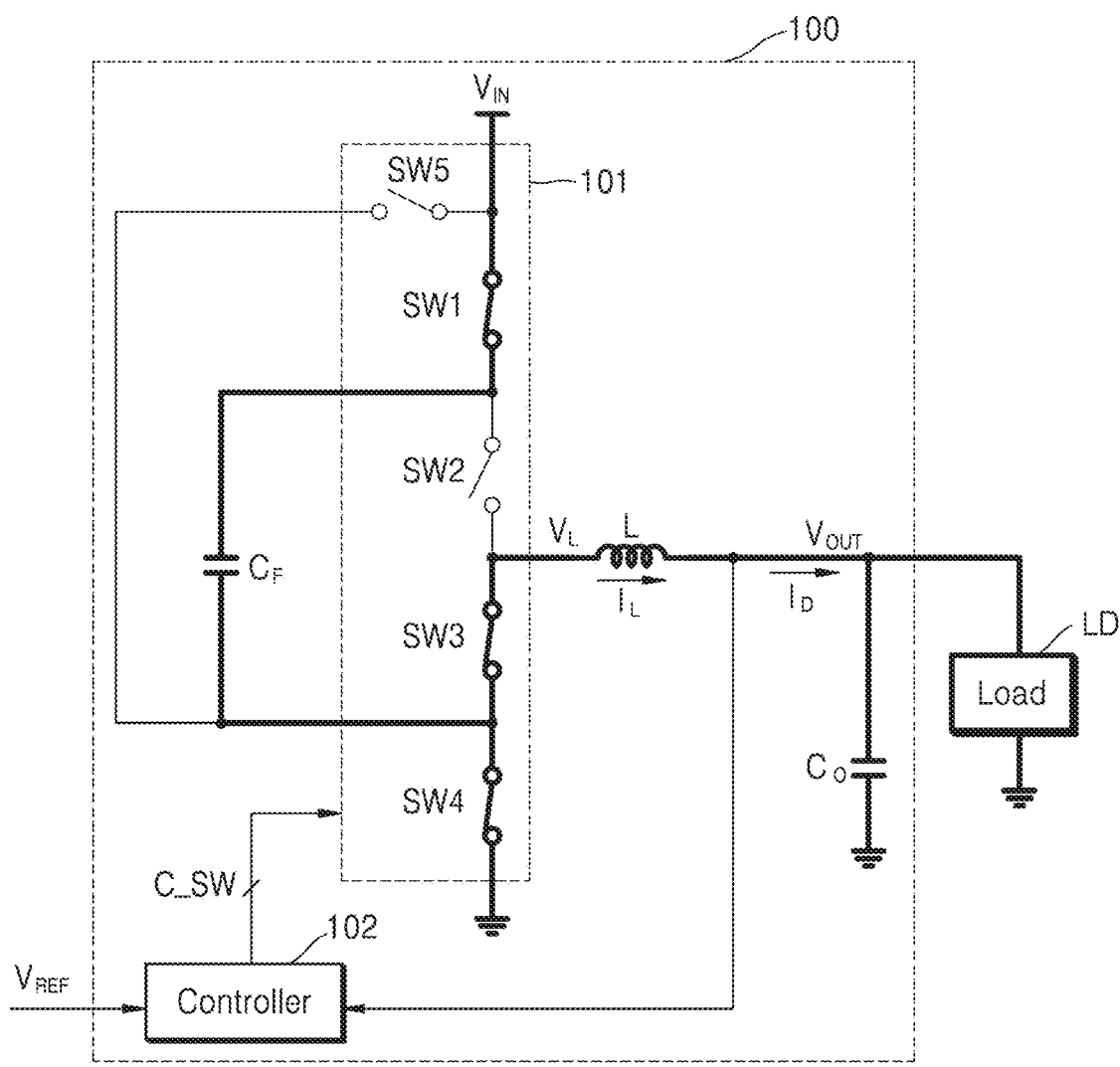
FIGS. 10A and 10B are circuit diagrams showing a switching regulator in a buck mode according to some example embodiments.
Figure 10B:
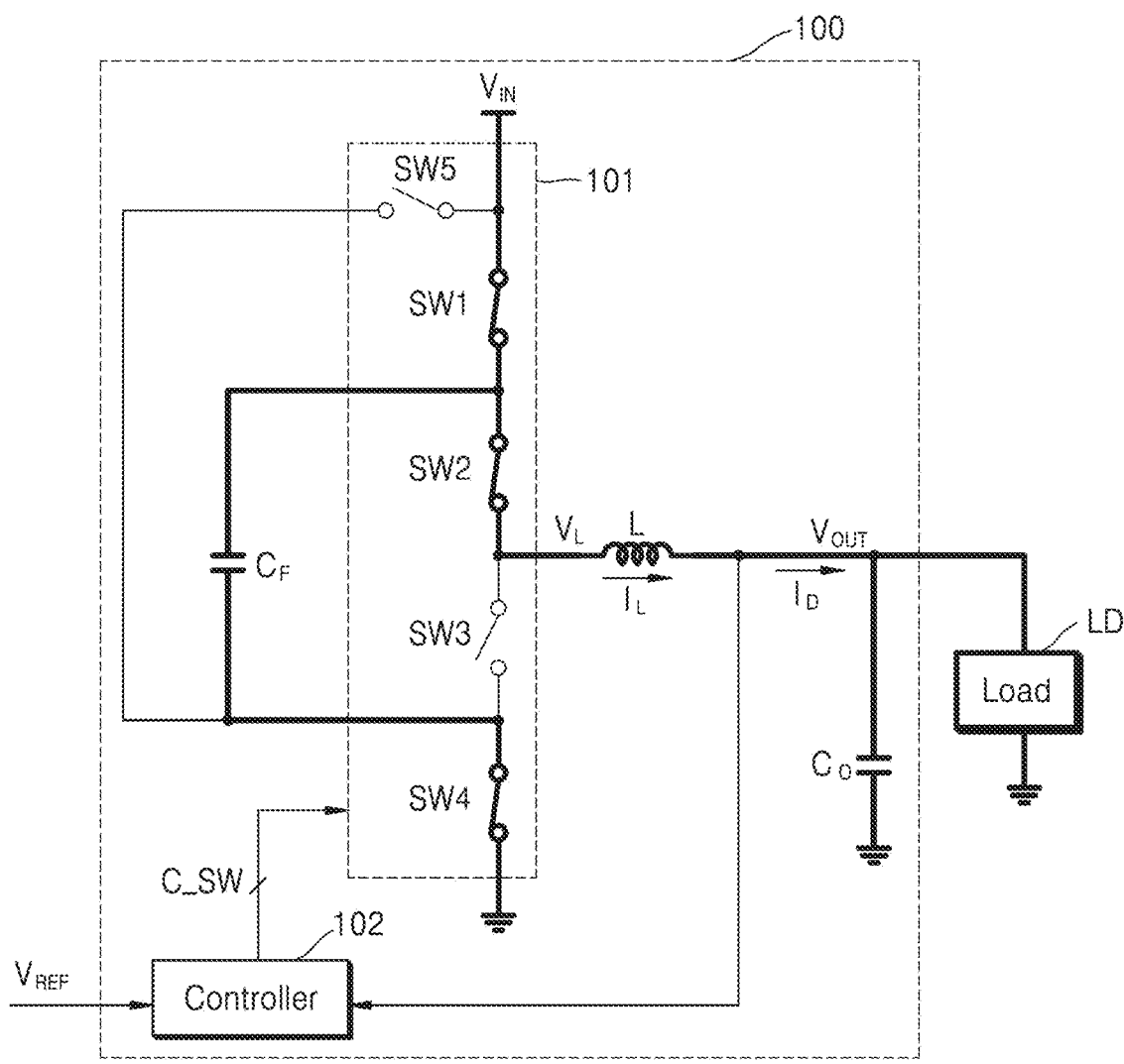
Figure 11:
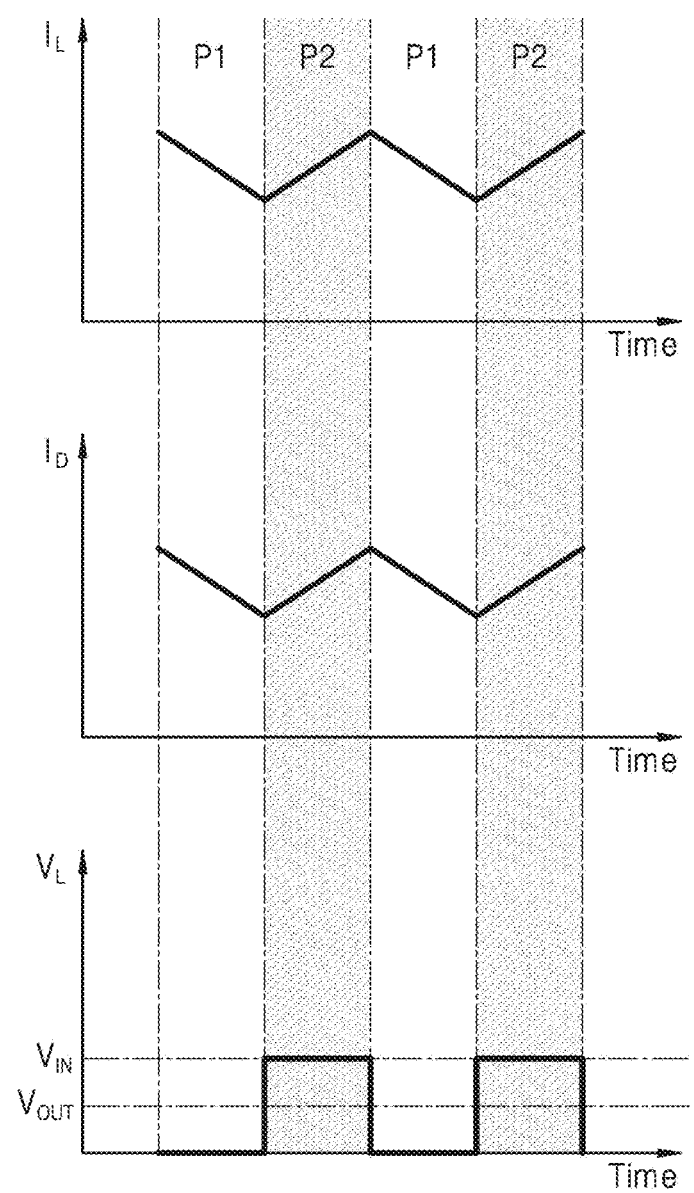
FIG. 11 is a timing diagram showing an example of an operation of the switching regulator of FIGS. 10A and 10B according to example embodiments.

FIGS. 10A and 10B are circuit diagrams showing a switching regulator 100 in a buck mode according to some example embodiments. FIG. 11 is a timing diagram showing an example of an operation of the switching regulator 100 of FIGS. 10A and 10B according to example embodiments. In detail, FIG. 10A shows the switching regulator 100 in the first phase P1 and FIG. 10B shows the switching regulator 100 in the second phase P2. In FIG. 10A and FIG. 10B, paths in which a current flows and switches that are turned ON are shown in bold.

Referring to FIG. 10A, similar to the switching regulator 30 of FIG. 3, the switching regulator 100 may include a switch circuit 101, a controller 102, the flying capacitor $C_F$, the inductor L, and the output capacitor $C_O$. The switch circuit 101 may include the first switch SW1, the second switch SW2, the third switch SW3, the fourth switch SW4, and the fifth switch SW5, and the load LD may be connected to the switching regulator 100. In the buck mode, in the first phase P1 the controller 102 may generate the switch control signal C_SW to turn ON the first switch SW1, the third switch SW3, and the fourth switch SW4 and turn OFF the second switch SW2 and the fifth switch SW5. In the buck mode, in some example embodiments, the switching regulator 100 may generate the output voltage $V_{OUT}$ that is lower than the input voltage $V_{IN}$, as shown in FIG. 11.

Both ends of the flying capacitor $C_F$ may be connected to an input node and a ground node, respectively, and the flying capacitor $C_F$ may be charged to the input voltage $V_{IN}$. In addition, the inductor current $I_L$ may flow from the ground node to the output capacitor $C_O$ and the load LD through the fourth switch SW4 and the third switch SW3 and the inductor L. Accordingly, as shown in FIG. 11, the inductor current $I_L$ may be gradually decreased, and the output delivery current $I_D$ may also be decreased. In addition, the inductor voltage $V_L$ may be identical to a ground voltage due to the third switch SW3 and the fourth switch SW4 that are turned ON.

Referring to FIG. 10B, in the buck mode, in the second phase P2 the controller 102 may generate the switch control signal C_SW to turn ON the first switch SW1, the second switch SW2, and the fourth switch SW4 and turn OFF the third switch SW3 and the fifth switch SW5. Therefore, in the buck mode, the first switch SW1 and the fourth switch SW may be ON and the fifth switch SW5 may be OFF. Accordingly, in the buck mode, the output voltage $V_{OUT}$ may be lower than the input voltage $V_{IN}$, and thus, as shown in FIG. 11, the inductor current $I_L$ may be gradually increased and the output delivery current $I_D$ may also be increased. In addition, the inductor voltage $V_L$ may be identical to the input voltage $V_{IN}$ due to the first switch SW1 and the second switch SW2 that are turned ON.

In the examples described above with reference to FIGS. 10A, 10B, and 11, the first switch SW1 and the fourth switch SW4 may be maintained ON, and both ends of the flying capacitor $C_F$ may be connected to an input node and a ground node throughout a switching period. Therefore, in the buck mode, the flying capacitor $C_F$ may suppress noise in the input voltage $V_{IN}$ by functioning as a decoupling capacitor (or a bypass capacitor) for the input voltage $V_{IN}$, and thus a relatively good voltage $V_{OUT}$ may be generated. For example, the flying capacitor $C_F$ may be used for pumping charges in the buck-boost mode and the boost mode and may suppress or reduce noise of the input voltage $V_{IN}$ in the buck mode. On the other hand, in some example embodiments, unlike in the examples shown in FIGS. 10A and 10B, the controller 102 may control the first switch SW1 in the same regard as the second switch SW2 and control the fourth switch SW4 in the same regard as the third switch SW3.

Figure 12:
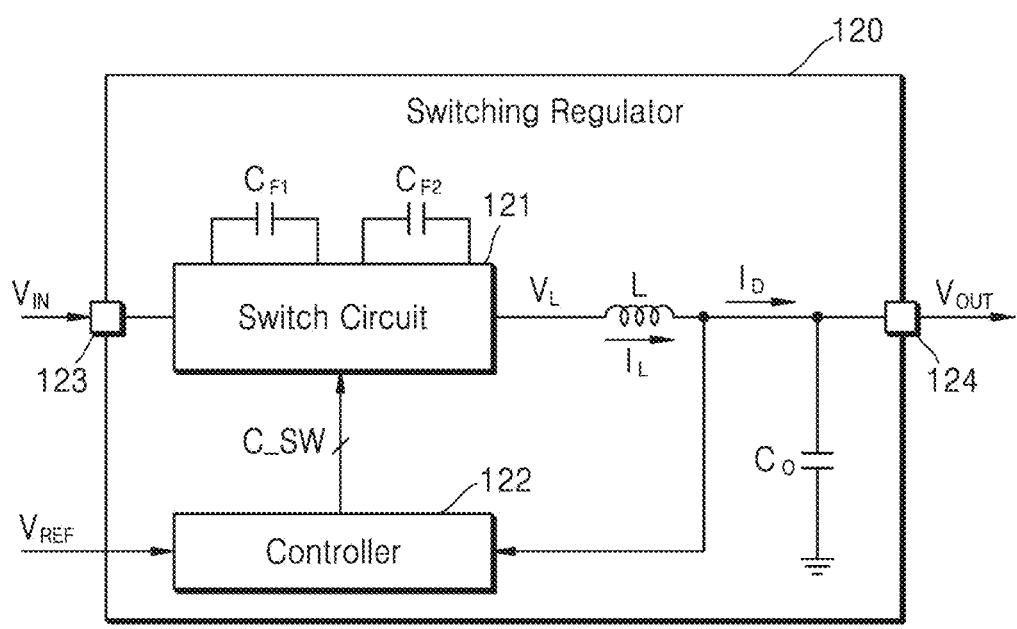
FIG. 12 is a block diagram showing a switching regulator according to some example embodiments.

FIG. 12 is a block diagram showing a switching regulator 120 according to some example embodiments. As shown in FIG. 12, the switching regulator 120 may include a switch circuit 121, a controller 122, the inductor L, and the output capacitor $C_O$. As compared to the switching regulator 10 of FIG. 1, the switching regulator 120 may include a plurality of flying capacitors including a first flying capacitor $C_{F1}$ and a second flying capacitor $C_{F2}$. Hereinafter, descriptions duplicated with those already given above may be omitted.

The switching regulator 120 may include two or more flying capacitors (e.g., $C_{F1}$ and $C_{F2}$) to provide the inductor voltage $V_L$ boosted in the buck-boost mode or the boost mode to the inductor L. The controller 122 may generate the switch control signal C_SW based on the reference voltage $V_{REF}$, such that the first flying capacitor $C_{F1}$, the second flying capacitor $C_{F2}$, and the switch circuit 121 function as a charge pump, wherein the inductor voltage $V_L$ that is greater than twice the input voltage $V_{IN}$, e.g., the inductor voltage $V_L$ is three times the input voltage $V_{IN}$, may be provided to the inductor L by the first flying capacitor $C_{F1}$ and the second flying capacitor $C_{F2}$. Unlike in the example shown in FIG. 12, in some example embodiments, the switching regulator 120 may include more than two flying capacitors. Also, similar to the description given above with reference to the drawings, not only the inductor current $I_L$, but also the output delivery current $I_D$ may be continuous throughout phases of a switching period.

Figure 13A:
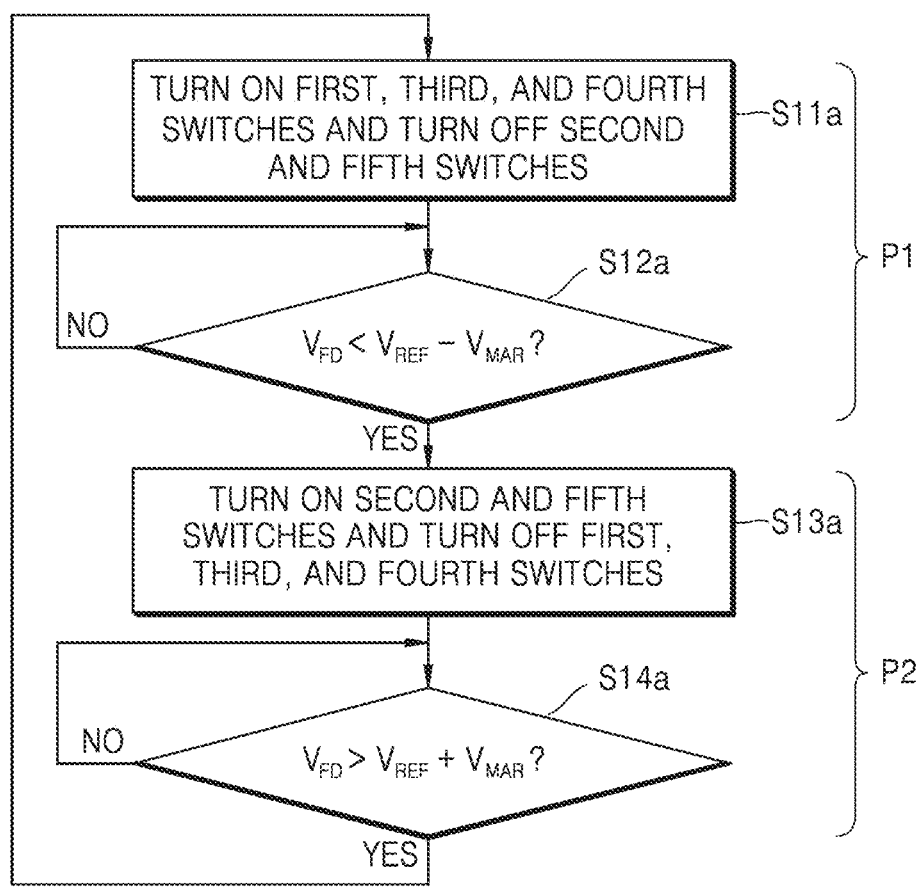
FIGS. 13A and 13B are flowcharts of a method of operating a switching regulator in a buck-boost mode, according to some example embodiments.
Figure 13B:
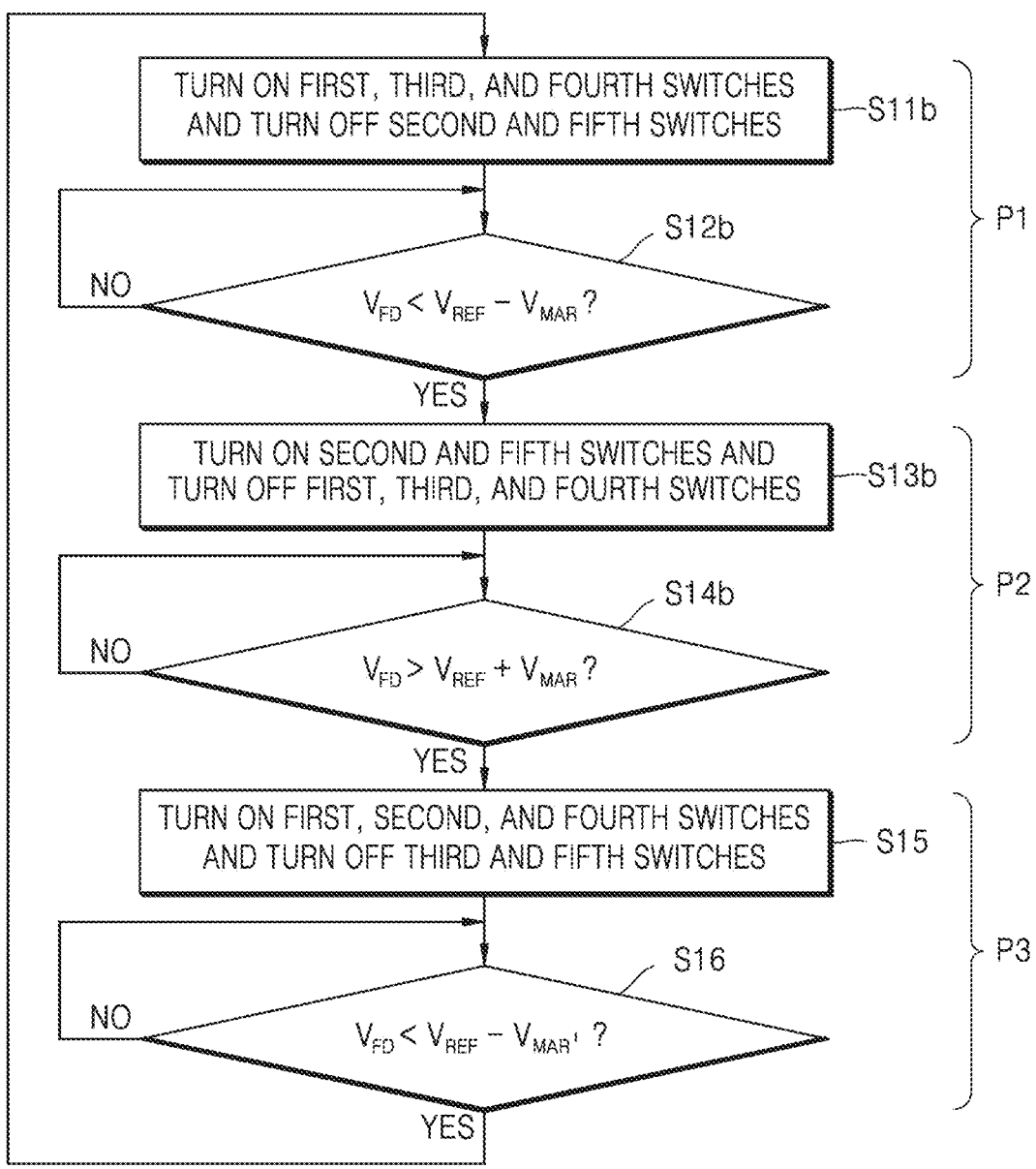

FIGS. 13A and 13B are flowcharts of a method of operating a switching regulator in a buck-boost mode, according to some example embodiments. In detail, FIG. 13A shows a method of operating a switching regulator according to a switching period including the first phase P1 and the second phase P2, and FIG. 13B shows a method of operating a switching regulator according to a switching period including the first phase P1, the second phase P2, and the third phase P3. In some example embodiments, the method of FIG. 13A may be performed by the controller 42 of FIGS. 4A and 4B, and the method of FIG. 13B may be performed by the controller 62 of FIG. 6. Hereinafter, FIG. 13A will be described with reference to FIGS. 4A, 4B, and 5, and FIG. 13B will be described with reference to FIGS. 6 and 7. Also, descriptions duplicated with those already given above will be omitted below.

Referring to FIG. 13A, operation S11a and operation S12 may be performed in the first phase P1, and operation S13a and operation S14a may be performed in the second phase P2. In operation S11a in the first phase P1, an operation for turning ON the first switch SW1, the third switch SW3, and the fourth switch SW4, and turning OFF the second switch SW2 and the fifth switch SW5 may be performed. For example, the controller 42 of FIG. 4A may generate the switch control signal C_SW, such that paths shown in bold in FIG. 4A are formed. As a result, the flying capacitor $C_F$ may be charged to the input voltage $V_{IN}$.

In operation S12a, an operation for comparing a feedback voltage $V_{FD}$ to a difference between the reference voltage $V_{REF}$ and a margin voltage $V_{MAR}$ may be performed (WAR>0). For example, the controller 42 may generate the feedback voltage $V_{FD}$ by dividing the output voltage $V_{OUT}$ and compare the feedback voltage $V_{FD}$ with the difference between the reference voltage $V_{REF}$ and the margin voltage $V_{MAR}$. As shown in FIG. 13A, when the feedback voltage $V_{FD}$ is less than the difference between the reference voltage $V_{REF}$ and the margin voltage $V_{MAR}$, the first phase P1 may be terminated and the second phase P2 may be initiated.

In operation S13a in the second phase P2, an operation for turning ON the second switch SW2 and the fifth switch SW5 and turning OFF the first switch SW1, the third switch SW3, and the fourth switch SW4 may be performed. For example, the controller 42 may generate the switch control signal C_SW, such that paths shown in bold in FIG. 4B are formed. As a result, the inductor voltage $V_L$ boosted by the flying capacitor $C_F$ may be provided to the inductor L.

In operation S14a, an operation for comparing the feedback voltage $V_{FD}$ with a sum of the reference voltage $V_{REF}$ and a margin voltage $V_{MAR}$ may be performed. As shown in FIG. 13A, when the feedback voltage $V_{FD}$ is greater than the sum of the reference voltage $V_{REF}$ and the margin voltage $V_{MAR}$, the second phase P2 may be terminated and the first phase P1 may be initiated. Therefore, the output voltage $V_{OUT}$ may be adjusted, such that the feedback voltage $V_{FD}$ is within a range between the sum of the reference voltage $V_{REF}$ and the margin voltage $V_{MAR}$ and the difference between the reference voltage $V_{REF}$ and the margin voltage $V_{MAR}$. In some example embodiments, the margin voltage used in operation S12a may be different from the margin voltage used in operation S14a.

Referring to FIG. 13B, operation S11b and operation S12b may be performed in the first phase P1, operation S13b and operation S14b may be performed in the second phase P2, and operation S15 and operation S16 may be performed in the third phase P3. In some example embodiments, operation S11b and operation S12b in the first phase P1 may be respectively similar to operation S11a and operation S12a of FIG. 13A, and operation S13b and operation S14b in the second phase P2 may be respectively similar to operation S13a and operation S14a of FIG. 13A. As shown in FIG. 13B, in operation S14b in the second phase P2, when the feedback voltage $V_{FD}$ is greater than the sum of the reference voltage $V_{REF}$ and the margin voltage $V_{MAR}$, the second phase P2 may be terminated and the third phase P3 may be initiated.

In operation S15 in the third phase P3, an operation for turning ON the first switch SW1, the second switch SW2, and the fourth switch SW4, and turning OFF the third switch SW3 and the fifth switch SW5 may be performed. For example, the controller 62 of FIG. 6 may generate the switch control signal C_SW such that the paths shown in bold in FIG. 6 are formed. Therefore, the inductor voltage $V_L$ may be identical to the input voltage $V_{IN}$, and the inductor current $I_L$ and output delivery current $I_D$ may be maintained substantially constant.

In operation S16, an operation for comparing the feedback voltage $V_{FD}$ to the difference between the reference voltage $V_{REF}$ and a margin voltage $V_{MAR}'$ may be performed ($V_{MAR}'>0$). In some example embodiments, the margin voltage $V_{MAR}'$ used in operation S16 may be less than the margin voltage $V_{MAR}$ used in operation S12b. Therefore, the switching regulator 60 may be in the third phase P3 until the feedback voltage $V_{FD}$ is at a level higher than the difference between the reference voltage $V_{REF}$ and the margin voltage $V_{MAR}'$. In some example embodiments, unlike as shown in FIG. 13B, it may be determined whether a pre-set time is reached in operation S16. When the pre-set time is reached, the third phase P3 may be terminated.

Figure 14:
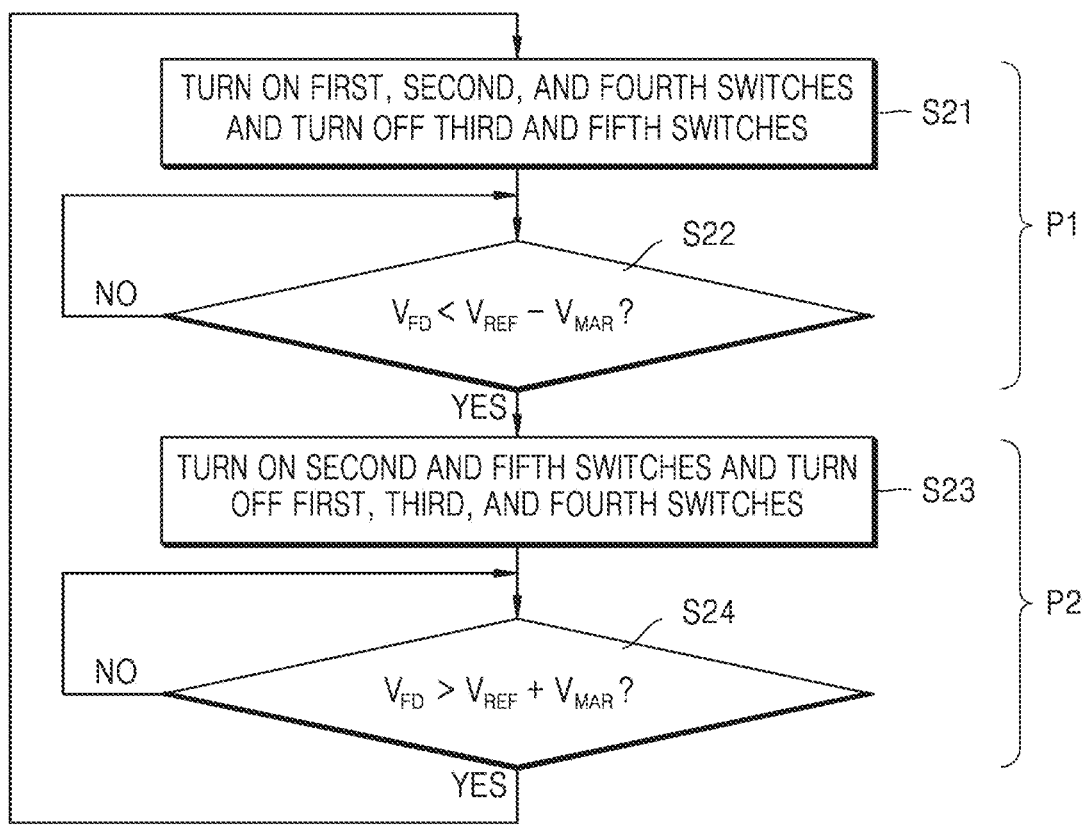
FIG. 14 is a flowchart of a method of operating a switching regulator in a boost mode, according to some example embodiments.

FIG. 14 is a flowchart of a method of operating a switching regulator in a boost mode, according to some example embodiments. In detail, FIG. 14 shows a method of operating a switching regulator according to a switching period including the first phase P1 and the second phase P2. In some example embodiments, the method of FIG. 14 may be performed by the controller 82 of FIGS. 8A and 8B. Hereinafter, FIG. 14 will be described with reference to FIGS. 8A, 8B, and 9.

As shown in FIG. 14, operation S21 and operation S22 may be performed in the first phase P1. In operation S21, an operation for turning ON the first switch SW1, the second switch SW2, and the fourth switch SW4, and turning OFF the third switch SW3 and the fifth switch SW5 may be performed. For example, the controller 82 of FIG. 8A may generate the switch control signal C_SW, such that paths shown in bold in FIG. 8A are formed. As a result, the flying capacitor $C_F$ may be charged to the input voltage $V_{IN}$. Then, in operation S22, an operation for comparing the feedback voltage $V_{FD}$ with the difference between the reference voltage $V_{REF}$ and a margin voltage $V_{MAR}$ may be performed. As shown in FIG. 14, when the feedback voltage $V_{FD}$ is less than the difference between the reference voltage $V_{REF}$ and the margin voltage $V_{MAR}$, the first phase P1 may be terminated and the second phase P2 may be initiated.

Operation S23 and operation S24 may be performed in the second phase P2. In operation S23, an operation for turning ON the second switch SW2 and the fifth switch SW5 and turning OFF the first switch SW1, the third switch SW3, and the fourth switch SW4 may be performed. For example, the controller 82 of FIG. 8B may generate the switch control signal C_SW, such that paths shown in bold in FIG. 8B are formed. As a result, the inductor voltage $V_L$ boosted by the flying capacitor $C_F$ may be provided to the inductor L. Then, in operation S24, an operation for comparing the feedback voltage $V_{FD}$ with the sum of the reference voltage $V_{REF}$ and the margin voltage $V_{MAR}$ may be performed. As shown in FIG. 14, when the feedback voltage $V_{FD}$ is greater than the sum of the reference voltage $V_{REF}$ and the margin voltage $V_{MAR}$, the second phase P2 may be terminated and the first phase P1 may be initiated. In some example embodiments, the margin voltage used in operation S22 may be different from the margin voltage used in operation S24.

Figure 15:
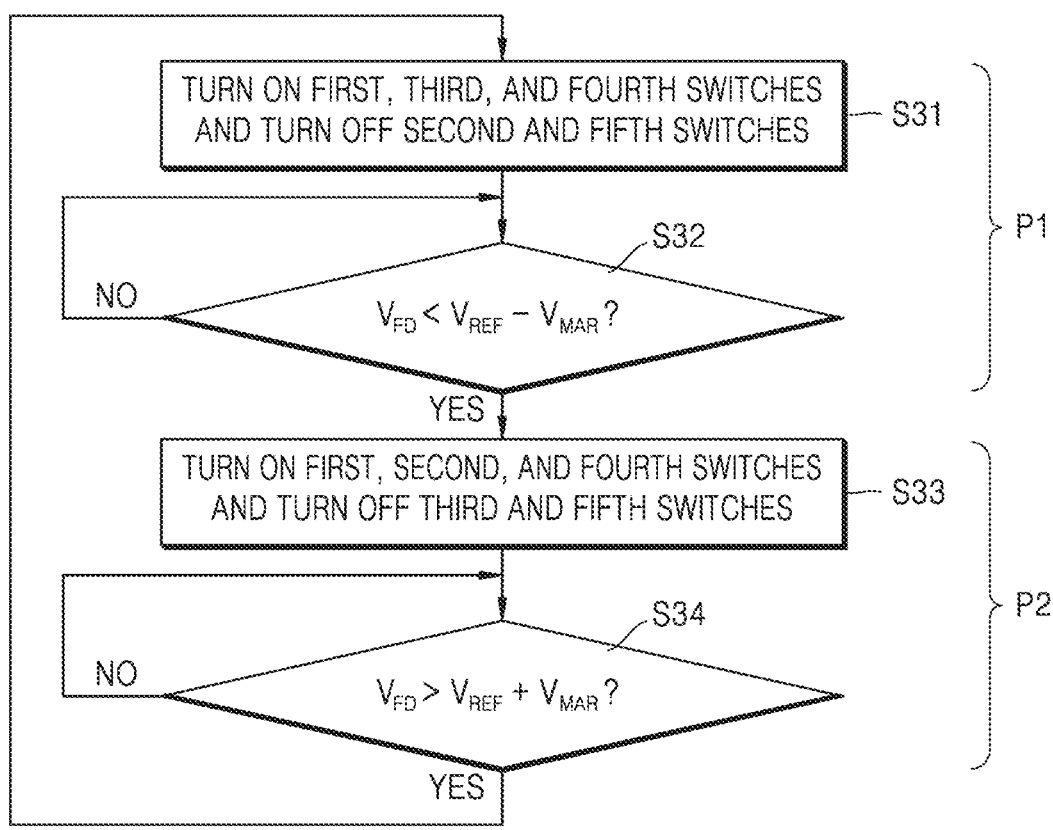
FIG. 15 is a flowchart of a method of operating a switching regulator in a buck mode, according to some example embodiments.

FIG. 15 is a flowchart of a method of operating a switching regulator in a buck mode according to some example embodiments. In detail, FIG. 15 shows a method of operating a switching regulator according to a switching period including the first phase P1 and the second phase P2. In some example embodiments, the method of FIG. 15 may be performed by the controller 102 of FIGS. 10A and 10B. Hereinafter, FIG. 15 will be described with reference to FIGS. 10A, 10B, and 11.

As shown in FIG. 15, operation S31 and operation S32 may be performed in the first phase P1. In operation S31, an operation for turning ON the first switch SW1, the third switch SW3, and the fourth switch SW4, and turning OFF the second switch SW2 and the fifth switch SW5 may be performed. For example, the controller 102 of FIG. 10A may generate the switch control signal C_SW, such that paths shown in bold in FIG. 10A are formed. Then, in operation S32, an operation for comparing the feedback voltage $V_{FD}$ with the difference between the reference voltage $V_{REF}$ and a margin voltage $V_{MAR}$ may be performed. As shown in FIG. 15, when the feedback voltage $V_{FD}$ is less than the difference between the reference voltage $V_{REF}$ and the margin voltage $V_{MAR}$, the first phase P1 may be terminated and the second phase P2 may be initiated.

As shown in FIG. 15, operation S33 and operation S34 may be performed in the second phase P2. In operation S33, an operation for turning ON the first switch SW1, the second switch SW2, and the fourth switch SW4, and turning OFF the third switch SW3 and the fifth switch SW5 may be performed. For example, the controller 102 of FIG. 10B may generate the switch control signal C_SW, such that paths shown in bold in FIG. 10B are formed. Then, in operation S34, an operation for comparing the feedback voltage $V_{FD}$ with the sum of the reference voltage $V_{REF}$ and the margin voltage $V_{MAR}$ may be performed. As shown in FIG. 15, when the feedback voltage $V_{FD}$ is greater than the sum of the reference voltage $V_{REF}$ and the margin voltage $V_{MAR}$, the second phase P2 may be terminated and the first phase P1 may be initiated. In some example embodiments, the margin voltage used in operation S32 may be different from the margin voltage used in operation S34.

Figure 16A:
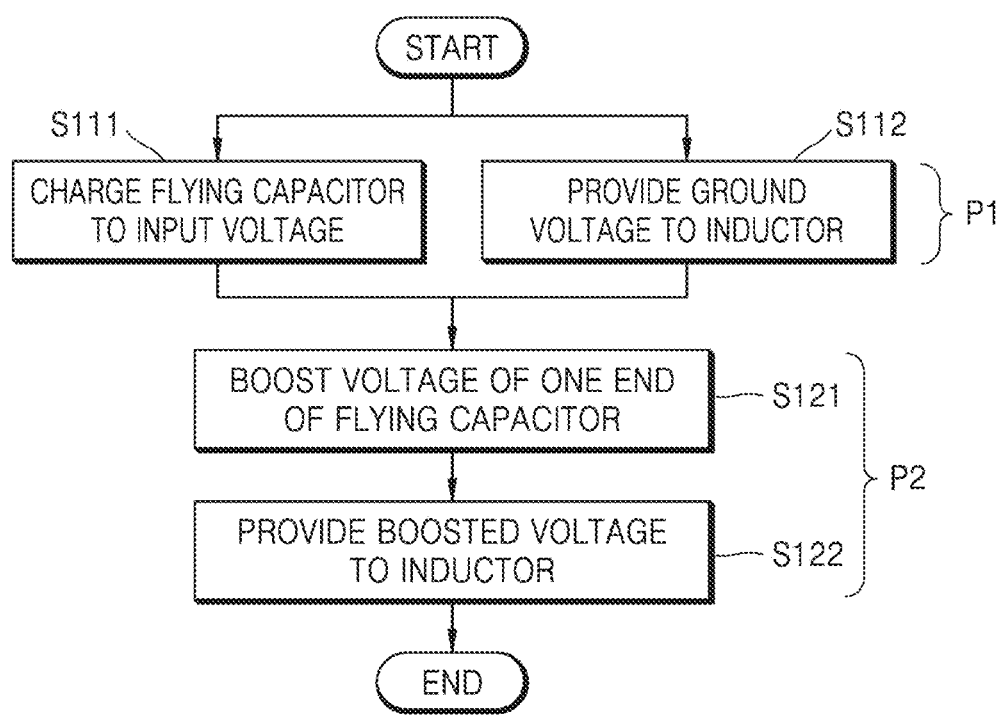
FIGS. 16A and 16B are flowcharts of a method of operating a switching regulator in a buck-boost mode, according to some example embodiments.
Figure 16B:
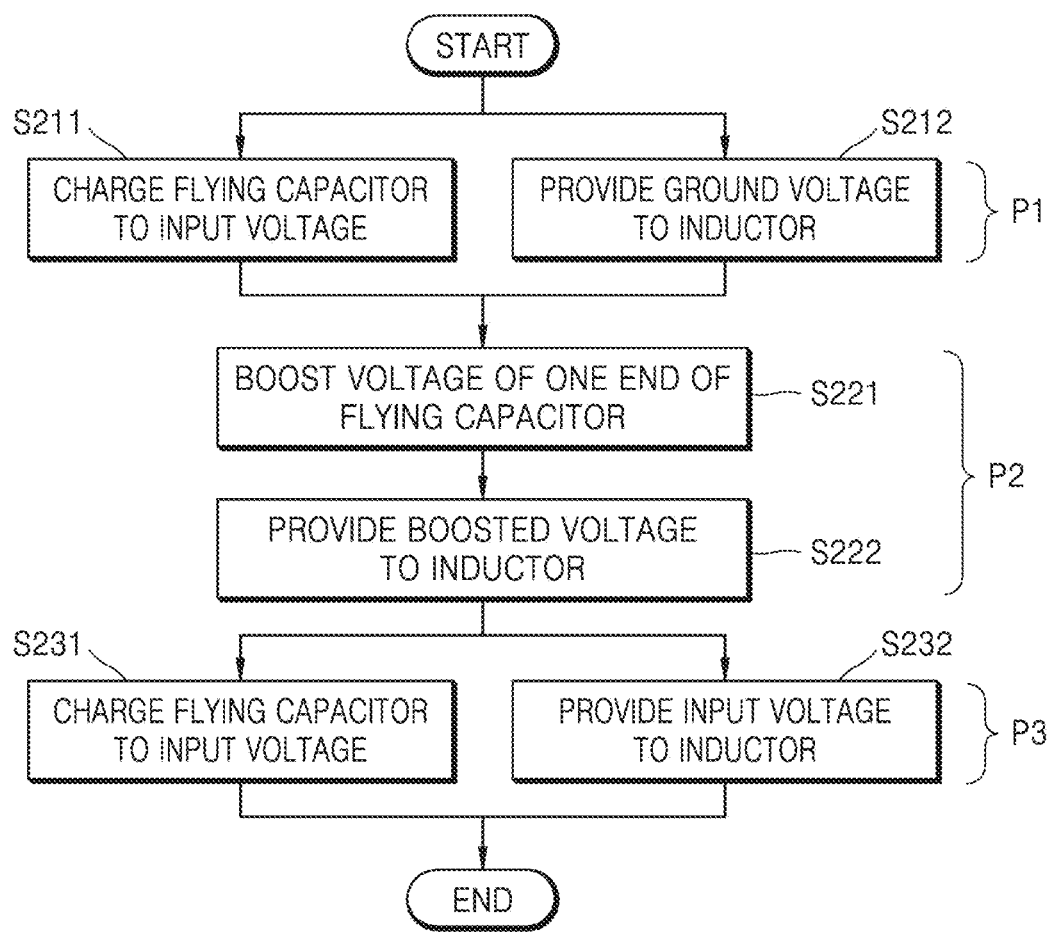

FIGS. 16A and 16B are flowcharts of a method of operating a switching regulator in a buck-boost mode, according to some example embodiments. In detail, FIG. 16A shows a method of operating a switching regulator performed during a switching period including the first phase P1 and the second phase P2, and FIG. 16B shows a method of operating a switching regulator performed during a switching period including the first phase P1, the second phase P2, and the third phase P3. In some example embodiments, the method of FIG. 16A may be performed by the switching regulator 40 of FIGS. 4A and 4B, and the method of FIG. 13B may be performed by the switching regulator 60 of FIG. 6. Hereinafter, FIG. 16A will be described with reference to FIGS. 4A, 4B, and 5, and FIG. 16B will be described with reference to FIGS. 6 and 7. Also, descriptions duplicated with those already given above will be omitted below.

Referring to FIG. 16A, operation S111 and operation S112 may be performed in parallel in the first phase P1. In operation S111, an operation for charging the flying capacitor $C_F$ to the input voltage $V_{IN}$ may be performed. For example, as shown in FIG. 4A, the flying capacitor $C_F$ may be charged to the input voltage $V_{IN}$ by the first switch SW1 and the fourth switch SW4 that are turned ON. Furthermore, in operation S112, an operation for providing a ground voltage to the inductor L may be performed. For example, as shown in FIG. 4A, the ground voltage may be provided to the inductor L by the third switch SW3 and the fourth switch SW4 that are turned ON.

Following, e.g. after, the first phase P1, operation S121 and operation S122 may be performed in the second phase P2. In operation S121, an operation for boosting a voltage at one end of the flying capacitor $C_F$ may be performed. For example, as shown in FIG. 4B, a voltage at one end of the flying capacitor $C_F$ (i.e., one and connected to the first switch SW1 and the second switch SW2) may be boosted to, for example, a voltage twice the input voltage $V_{IN}$ by the first switch SW1 and the fourth switch SW4 that are turned OFF and the fifth switch SW5 that is turned ON. In operation S122, an operation for providing a boosted voltage to the inductor L may be performed. For example, as shown in FIG. 4B, a voltage boosted by the second switch SW2 that is turned ON may be provided to the inductor L as the inductor voltage $V_L$.

Referring to FIG. 16B, operation S211 and operation S212 may be performed in parallel in the first phase P1, operation S221 and operation S222 may be performed in the second phase P2, and operation S231 and operation S232 may be performed in parallel in the third phase P3. In some example embodiments, operation S211 and operation S212 in the first phase P1 may be respectively similar to operation S121 and operation S122 of FIG. 16A, and operation S221 and operation S222 in the second phase P2 may be respectively similar to operation S121 and operation S122 of FIG. 16A. The third phase P3 may be initiated after the second phase P2.

In operation S231 in the third phase P3, an operation for charging the flying capacitor $C_F$ to the input voltage $V_{IN}$ may be performed. For example, as shown in FIG. 6, the flying capacitor $C_F$ may be charged to the input voltage $V_{IN}$ by the first switch SW1 and the fourth switch SW4 that are turned ON. Furthermore, in operation S232, an operation for providing the input voltage $V_{IN}$ to the inductor L may be performed. For example, as shown in FIG. 6, the input voltage $V_{IN}$ may be provided to the inductor L by the first switch SW1 and the second switch SW2 that are turned ON.

Figure 17:
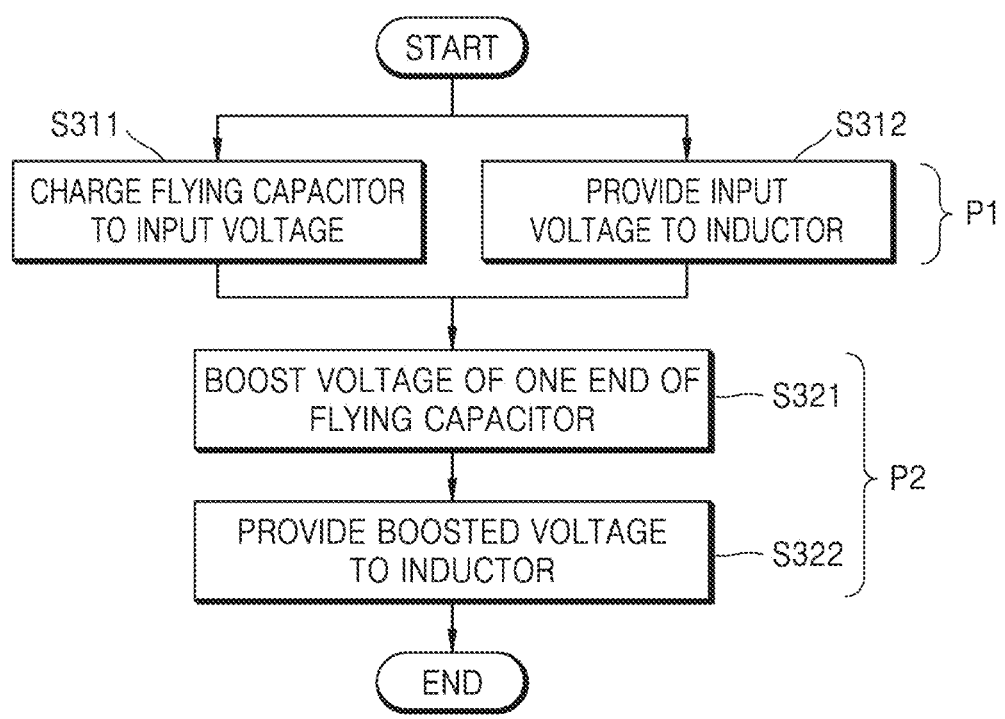
FIG. 17 is a flowchart of a method of operating a switching regulator in a boost mode, according to some example embodiments.

FIG. 17 is a flowchart of a method of operating a switching regulator in a boost mode according to some example embodiments. In detail, FIG. 17 shows a method of operating a switching regulator performed during a switching period including the first phase P1 and the second phase P2. In some example embodiments, the method of FIG. 17 may be performed by the switching regulator 80 of FIGS. 8A and 8B, and hereafter, FIG. 17 will be described with reference to FIGS. 8A, 8B, and 9.

Referring to FIG. 17, operation S311 and operation S312 may be performed in parallel in the first phase P1. In operation S311, an operation for charging the flying capacitor $C_F$ to the input voltage $V_{IN}$ may be performed. For example, as shown in FIG. 8A, the flying capacitor $C_F$ may be charged to the input voltage $V_{IN}$ by the first switch SW1 and the fourth switch SW4 that are turned ON. Furthermore, in operation S312, an operation for providing the input voltage $V_{IN}$ to the inductor L may be performed. For example, as shown in FIG. 8A, the input voltage $V_{IN}$ may be provided to the inductor L by the first switch SW1 and the second switch SW2 that are turned ON.

Following the first phase P1, operation S321 and operation S322 may be performed in the second phase P2. In operation S321, an operation for boosting a voltage at one end of the flying capacitor $C_F$ may be performed. For example, as shown in FIG. 8B, a voltage at one end of the flying capacitor $C_F$ (i.e., one end connected to the first switch SW1 and the second switch SW2) may be boosted to, for example, a voltage twice the input voltage $V_{IN}$ by the first switch SW1 and the fourth switch SW4 that are turned OFF and the fifth switch SW5 that is turned ON. In operation S322, an operation for providing a boosted voltage to the inductor L may be performed. For example, as shown in FIG. 8B, a voltage boosted by the second switch SW2 that is turned ON may be provided to the inductor L as the inductor voltage $V_L$.

Figure 18:
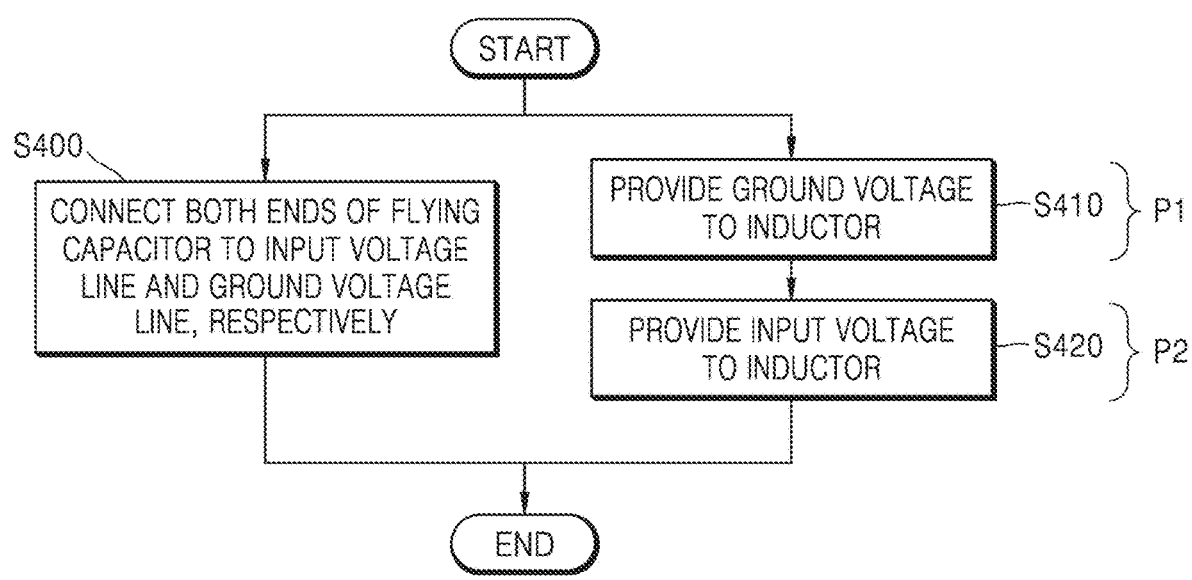
FIG. 18 is a flowchart of a method of operating a switching regulator in a buck mode, according to some example embodiments.

FIG. 18 is a flowchart of a method of operating a switching regulator in a buck mode according to some example embodiments. In detail, FIG. 18 shows a method of operating a switching regulator performed during a switching period including the first phase P1 and the second phase P2. In some example embodiments, the method of FIG. 18 may be performed by the switching regulator 100 of FIGS. 10A and 10B, and hereafter, FIG. 18 will be described with reference to FIGS. 10A, 10B, and 11.

Referring to FIG. 18, operation S410 may be performed in the first phase P1, operation S420 may be performed in the second phase P2, and operation S400 may be performed in parallel with operation S410 and operation S420 in the first phase P1 and the second phase P2. In operation S400, an operation for respectively connecting both ends of the flying capacitor $C_F$ to the input voltage $V_{IN}$ and the output voltage $V_{OUT}$ may be performed. For example, as shown in FIGS. 10A and 10B, in the buck mode, the first switch SW1 and the fourth switch SW4 may be turned ON. Therefore, the flying capacitor $C_F$ may function as a decoupling capacitor that eliminates or reduces noise in the input voltage $V_{IN}$.

In operation S410, an operation for providing a ground voltage to the inductor L may be performed. For example, as shown in FIG. 10A, the ground voltage may be provided to the inductor L by the third switch SW3 and the fourth switch SW4 that are turned ON. Then, in operation S420 in the second phase P2, an operation for providing the input voltage $V_{IN}$ to the inductor L may be performed. For example, as shown in FIG. 10B, the input voltage $V_{IN}$ may be provided to the inductor L by the first switch SW1 and the second switch SW2 that are turned ON.

Figure 19:
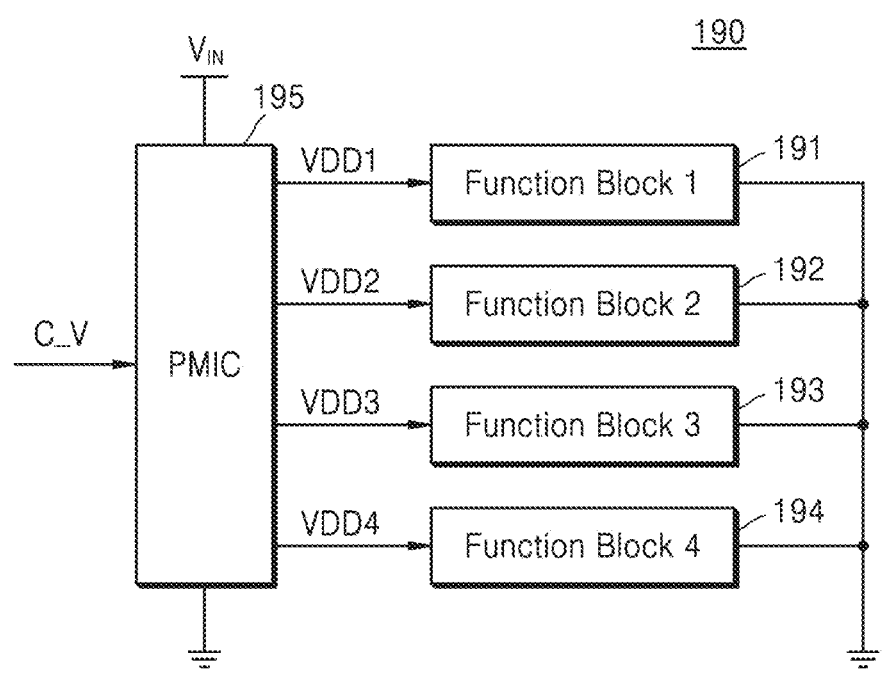
FIG. 19 is a diagram showing a system according to some example embodiments.

FIG. 19 is a diagram showing a system 190 according to some example embodiments. The system 190 may be or include one semiconductor integrated circuit like a system-on-chip (SoC) in some example embodiments and may include a printed circuit board and packages mounted thereon in some example embodiments. As shown in FIG. 19, the system 190 may include a first function block 191, a second function block 192, a third function block 193, a fourth function block 194, and a power management integrated circuit (PMIC) 195. Although in addition to the PMIC 195, four function blocks are illustrated, inventive concepts are not limited thereto. For example, the system may include the PMIC 195 and the first through third function blocks 191-193, or may include other function blocks less than or more than the number of function blocks illustrated.

In some non-limiting example embodiments, the first function block 191, the second function block 192, the third function block 193, and the fourth function block 194 may operate based on power provided by a first supply voltage VDD1, a second supply voltage VDD2, a third supply voltage VDD3, and a fourth supply voltage VDD4 output from the PMIC 195. For example, at least one of the first function block 191, the second function block 192, the third function block 193, and the fourth function block 194 may be a digital circuit for processing a digital signal (e.g., an application processor (AP)) or an analog circuit for processing an analog signal (e.g., an amplifier). Also, at least one of the first function block 191, the second function block 192, the third function block 193, and the fourth function block 194 may be a circuit for processing a mixed signal (e.g., an analog-to-digital converter (ADC)). As mentioned above, although FIG. 19 shows that the system 190 includes four function blocks, in some example embodiments, system 190 may include fewer than four function blocks or five or more function blocks.

The PMIC 195 may generate the first supply voltage VDD1, the second supply voltage VDD2, the third supply voltage VDD3, and the fourth supply voltage VDD4 from the input voltage $V_{IN}$ and change the level of at least one of the first supply voltage VDD1, the second supply voltage VDD2, the third supply voltage VDD3, and the fourth supply voltage VDD4 according to a voltage control signal C_V. At least one of the first function block 191, the second function block 192, the third function block 193, and the fourth function block 194 may receive a supply voltage having a level dynamically varying according to required performance and power consumption. For example, the first function block 191 may be an image processor for processing image data. The first function block 191 may receive the first supply voltage VDD1 of a high level while processing a moving image including a series of images. Meanwhile, the first function block 191 may receive the first supply voltage VDD1 of a low level while processing a picture including a single image. The PMIC 195 may receive the voltage control signal C_V corresponding to the performance and the power consumption required by the first function block 191 and the PMIC 195 may increase or decrease the level of the first supply voltage VDD1 based on the voltage control signal C_V. A method of dynamically changing the level of a supply voltage for a function block may be referred to as a dynamic voltage scaling (DVS).

The PMIC 195 may include a switching regulator as described above with reference to the drawings. Therefore, the first supply voltage VDD1 may have reduced noise when a constant voltage level is maintained, and the operational reliability of the first function block 191 and the system 190 may be improved due to the reduced noise of the first supply voltage VDD1. Also, the level of the first supply voltage VDD1 may be changed quickly. In some example embodiments, the first function block 191 may stop operation while the level of the first supply voltage VDD1 is being changed and may resume operation after the level of the first supply voltage VDD1 is changed. Thus, when the level of the first supply voltage VDD1 is changed quickly, a time that the first function block 191 performs an operation may be shortened, and as a result, the system 190 may provide improved performance. In addition, the PMIC 195 may have a peak value of a reduced voltage and/or current and may include devices with reduced sizes. Therefore, the PMIC 195 may be easily integrated with the first function block 191, the second function block 192, the third function block 193, and the fourth function block 194 in one package.

Figure 20:
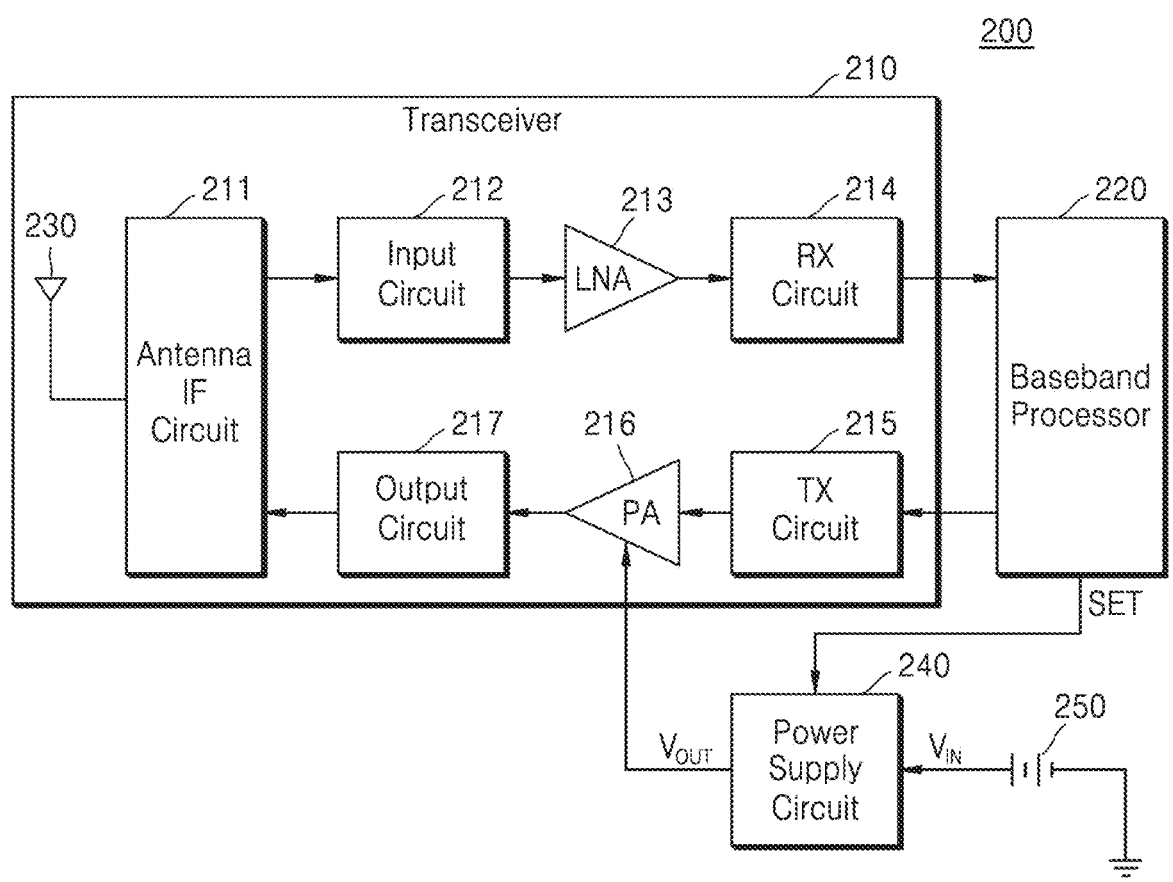
FIG. 20 is a block diagram showing a wireless communication apparatus according to some example embodiments.

FIG. 20 is a block diagram showing a wireless communication apparatus 200 according to some example embodiments. In detail, FIG. 20 shows a user equipment (UE), e.g. a terminal, to which power is provided by a battery 250. In some example embodiments, the wireless communication apparatus 200 may be included in a wireless communication system using a cellular network like 5G and LTE or may be included in a wireless local area network (WLAN) or any other wireless communication system. In the wireless communication apparatus 200, a switching regulator according to some example embodiments may be used to provide variable power to a power amplifier 216. As shown in FIG.

20, the wireless communication apparatus 200 may include a transceiver 210, a baseband processor 220, an antenna 230, a power circuit 240, and the battery 250.

The transceiver 210 may include an antenna interface circuit 211, a receiver and a transmitter. The receiver may include an input circuit 212, a low-noise amplifier 213, and a reception circuit 214. The transmitter may include a transmission circuit 215, the power amplifier 216, and an output circuit 217. The antenna interface circuit 211 may connect a transmitter or a receiver to the antenna 230 according to a transmission mode or a reception mode. In some example embodiments, the input circuit 212 may include a matching circuit or a filter, the low-noise amplifier 213 may amplify an output signal of the input circuit 212, and the reception circuit 214 may include a mixer for down-conversion. In some example embodiments, the transmission circuit 215 may include a mixer for up-conversion, the power amplifier 216 may amplify an output signal of the transmission circuit 215, and the output circuit 217 may include a matching circuit or a filter.

The baseband processor 220 may transmit/receive baseband signals to/from the transceiver 210 and may perform modulation/demodulation, encoding/decoding, etc. In some example embodiments, the baseband processor 220 may be referred to as a communication processor or a modem. The baseband processor 220 may generate a set signal SET for setting an average power tracking mode or an envelope tracking mode and generate a set signal SET for changing the level of the output voltage $V_{OUT}$.

The power circuit 240 may receive the input voltage $V_{IN}$ from the battery 250 and may generate the output voltage $V_{OUT}$ for providing power to the power amplifier 216. The power circuit 240 may include a switching regulator as described above with reference to the drawings and may generate a continuous output delivery current, thereby enabling a quick level change of the output voltage $V_{OUT}$ and a stable level of the output voltage $V_{OUT}$.

While inventive concepts has been particularly shown and described with reference to embodiments thereof, it will be understood that various changes in form and details may be made therein without departing from the spirit and scope of the following claims.

What is claimed is:

1. A switching regulator configured to generate an output voltage from an input voltage, the switching regulator comprising:
    an inductor;
    an output capacitor configured to generate the output voltage based on a current passing through the inductor;
    a plurality of switches including at least five switches, configured to control a voltage applied to the inductor;
    a flying capacitor connected to an input node through at least two of the at least five switches, the input node receiving the input voltage; and
    a controller configured to set one of a buck mode, a buck-boost mode and a boost mode based on the input voltage and a reference voltage,
    wherein the buck mode, the buck-boost mode and the boost mode correspond to different ranges of the output voltage, respectively,
    wherein the controller is configured to, based on the set mode, control the at least five switches to
    generate a boosted voltage by charge pumping the flying capacitor from the input voltage to increase the output voltage in the buck-boost mode and the boost mode, and
    allow the flying capacitor to suppress noise in the input voltage in the buck mode.

2. The switching regulator of claim 1, wherein the controller is configured to
    determine a target voltage level of the output voltage based on the reference voltage, and
    set one of the buck mode, the buck-boost mode and the boost mode based on a result of the determination of the target voltage.

3. The switching regulator of claim 2, wherein the controller is configured to
    set the buck mode when the target voltage level of the output voltage is equal to or less than 90% of the input voltage,
    set the buck-boost mode when the target voltage level of the output voltage is higher than 90% of the input voltage and lower than 110% of the input voltage, and
    set the boost mode when the target voltage level of the output voltage is equal to or higher than 110% of the input voltage.

4. The switching regulator of claim 1, wherein the at least five switches comprise:
    a first switch connected between the input node and a first end of the flying capacitor;
    a second switch connected between the first end of the flying capacitor and the inductor;
    a third switch connected between the inductor and a second end of the flying capacitor;
    a fourth switch connected between the second end of the flying capacitor and a ground node; and
    a fifth switch connected between the input node and the second end of the flying capacitor.

5. The switching regulator of claim 4, wherein, when the boost mode is set, the controller is configured to
    turn on the first switch, the third switch and the fourth switch and turn off the second switch and the fifth switch in a first phase, and
    turn on the second switch and the fifth switch and turn off the first switch, the third switch and the fourth switch in a second phase.

6. The switching regulator of claim 5, wherein, when the boost mode is set, the controller is configured to turn on the first switch, the second switch and the fourth switch and turn off the third switch and the fifth switch in a third phase, wherein the third phase is subsequent to the second phase.

7. The switching regulator of claim 4, wherein, when the buck-boost mode is set, the controller is configured to
    turn on the first switch, the second switch and the fourth switch and turn off the third switch and the fifth switch in a first phase, and
    turn on the second switch and the fifth switch and turn off the first switch, the third switch and the fourth switch in a second phase.

8. The switching regulator of claim 4, wherein, when the buck mode is set, the controller is configured to
    turn on the first switch, the third switch and the fourth switch and turn off the second switch and the fifth switch in a first phase, and
    turn on the first switch, the second switch and the fourth switch and turn off the third switch and the fifth switch in a second phase.

9. The switching regulator of claim 1, wherein each of the at least five switches comprises at least one of N-channel field effect transistor (NFET) or a P-channel field effect transistor (PFET) which has a gate controlled by the controller.

10. A method of generating an output voltage from an input voltage, the method comprising:
setting one of a buck mode, a buck-boost mode and a boost mode based on the input voltage and a reference voltage;
controlling at least five switches based on the set mode to provide a voltage to an inductor; and
generating the output voltage based on a current passing through the inductor,
wherein the buck mode, the buck-boost mode and the boost mode correspond to different ranges of the output voltage, respectively,
wherein the controlling at least five switches comprises:
generating a boosted voltage by charge pumping a flying capacitor from the input voltage to increase the output voltage when the buck-boost mode or the boost mode is set, and
allowing the flying capacitor to suppress nose in the input voltage when the buck mode is set,
wherein the flying capacitor is connected to an input node through at least two of the at least five switches,
wherein the input node is configured to receive the input voltage.

11. The method of claim 10, wherein the setting one of the buck mode, the buck-boost mode and the boost mode comprises:
determining a target voltage level of the output voltage based on the reference voltage; and
setting one of the buck mode, the buck-boost mode and the boost mode based on a result of the determination of the target voltage.

12. The method of claim 11, wherein the setting one of the buck mode, the buck-boost mode and the boost mode based on the input voltage and the target voltage level of the output voltage comprises
setting the buck mode when the target voltage level of the output voltage is equal to or less than 90% of the input voltage,
setting the buck-boost mode when the target voltage level of the output voltage is higher than 90% of the input voltage and lower than 110% of the input voltage, and
setting the boost mode when the target voltage level of the output voltage is equal to or higher than 110% of the input voltage.

13. The method of claim 10, wherein the at least five switches comprise:
a first switch connected between the input node and a first end of the flying capacitor;
a second switch connected between the first end of the flying capacitor and the inductor;
a third switch connected between the inductor and a second end of the flying capacitor;
a fourth switch connected between the second end of the flying capacitor and a ground node; and
a fifth switch connected between the input node and the second end of the flying capacitor.

14. The method of claim 13, wherein the controlling the at least five switches comprises:
when the boost mode is set, turning on the first switch, the third switch and the fourth switch and turning off the second switch and the fifth switch in a first phase; and
when the boost mode is set, turning on the second switch and the fifth switch and turning off the first switch, the third switch and the fourth switch in a second phase.

15. The method of claim 14, wherein the controlling the at least five switches comprises:
when the boost mode is set, turning on the first switch, the second switch and the fourth switch and turning off the third switch and the fifth switch in a third phase,
wherein the third phase is subsequent to the second phase.

16. The method of claim 13, wherein the controlling the at least five switches comprises:
when the buck-boost mode is set, turning on the first switch, the second switch and the fourth switch and turning off the third switch and the fifth switch in a first phase, and
when the buck-boost mode is set, turning on the second switch and the fifth switch and turning off the first switch, the third switch and the fourth switch in a second phase.

17. The method of claim 13, wherein the controlling the at least five switches comprises:
when the buck mode is set, turning on the first switch, the third switch and the fourth switch and turning off the second switch and the fifth switch in a first phase, and
when the buck mode is set, turning on the first switch, the second switch and the fourth switch and turning off the third switch and the fifth switch in a second phase.

18. A switching regulator configured to operate repeatedly according to a period comprising a first, a second and a third phases subsequently, the switching regulator comprising:
an inductor;
an output capacitor configured to generate an output voltage based on a current passing through the inductor;
a flying capacitor;
a plurality of switches configured to control an input voltage applied to the inductor; and
a controller configured to control the plurality of switches,
wherein the plurality of switches are, based on the control of the controller, configured to
charge the flying capacitor to the input voltage and provide a ground voltage to the inductor in a first phase,
provide a voltage boosted by the voltage charged in the flying capacitor from the input voltage in a second phase, and
charge the flying capacitor to the input voltage and provide the input voltage to the inductor in a third phase,
wherein the controller configured to
generate a feedback voltage by dividing the output voltage,
terminate the first phase and initiate the second phase when the feedback voltage is less than a difference between a reference voltage and a first margin voltage, and
terminate the third phase and initiate the first phase when the feedback voltage is less than a difference between the reference voltage and a second margin voltage,
wherein the second margin voltage is less than the first margin voltage.

19. A switching regulator configured to operate repeatedly according to a period comprising a first, a second and a third phases subsequently, the switching regulator comprising:
an inductor;
an output capacitor configured to generate an output voltage based on a current passing through the inductor;
a flying capacitor;
a plurality of switches configured to control an input voltage applied to the inductor; and
a controller configured to control the plurality of switches, wherein the plurality of switches are, based on the control of the controller, configured to
  charge the flying capacitor to the input voltage and provide a ground voltage to the inductor in a first phase,
  provide a voltage boosted by the voltage charged in the flying capacitor from the input voltage in a second phase, and
  charge the flying capacitor to the input voltage and provide the input voltage to the inductor in a third phase, and
wherein the controller configured to terminate the third phase and initiate the first phase when a pre-set time is reached after initiating the third phase.

* * * * *